United States Patent [19]
Conoscenti et al.

[11] Patent Number: 5,627,836
[45] Date of Patent: May 6, 1997

[54] VPI/VCI ADMINISTRATION

[75] Inventors: Lisa Conoscenti, Laurel, Md.; Kathy Daley, Manassas, Va.; Henry Trogden, Fords, N.J.; Carmen Hossain, Olney; Amos Lucas, Dundalk, both of Md.

[73] Assignee: Bell Atlantic Network Services, Inc., Arlington, Va.

[21] Appl. No.: 380,758

[22] Filed: Jan. 31, 1995

[51] Int. Cl.$^6$ ............................. H04N 7/173; H04L 12/56
[52] U.S. Cl. ............................. 370/397; 370/486; 348/7; 455/3.1
[58] Field of Search ............................. 370/17, 60, 60.1, 370/94.2, 99, 73, 74; 348/6, 7, 10, 12, 13; 455/2–5.1; 379/102–105

[56] References Cited

U.S. PATENT DOCUMENTS

| | | | |
|---|---|---|---|
| 4,506,387 | 3/1985 | Walter | 455/3.1 |
| 4,949,187 | 8/1990 | Cohen | 360/15 |
| 4,963,995 | 10/1990 | Lang | 360/8 |
| 5,027,400 | 6/1991 | Baji et al. | |
| 5,057,932 | 10/1991 | Lang | 360/8 |
| 5,119,369 | 6/1992 | Tanabe | 370/60 |
| 5,130,792 | 7/1992 | Tindell et al. | 379/100 |
| 5,132,992 | 7/1992 | Yurt et al. | 455/5.1 |
| 5,133,079 | 7/1992 | Ballantyne et al. | 455/4.1 |
| 5,228,028 | 7/1993 | Cucchi | 370/94.1 |
| 5,247,347 | 9/1993 | Litteral | 379/105 |
| 5,253,275 | 10/1993 | Yurt et al. | 455/5.1 |
| 5,260,783 | 11/1993 | Dixit | |
| 5,271,010 | 12/1993 | Miyake | 370/60 |
| 5,276,676 | 1/1994 | Horn et al. | 370/17 |
| 5,287,349 | 2/1994 | Hyodo | 370/60.1 |
| 5,301,184 | 4/1994 | Uriu | 370/16 |
| 5,323,289 | 6/1994 | Bitz | 370/60.1 |
| 5,325,356 | 6/1994 | Lyles | 370/60 |
| 5,327,421 | 7/1994 | Hiller | 370/60.1 |
| 5,339,318 | 8/1994 | Tanaka | 370/110.1 |
| 5,345,445 | 9/1994 | Hiller | 370/60.1 |
| 5,345,446 | 9/1994 | Hiller | 370/60.1 |
| 5,345,558 | 9/1994 | Opher et al. | 370/94.1 |
| 5,357,508 | 10/1994 | LeBoudec | 370/60.1 |
| 5,365,524 | 11/1994 | Hiller | 370/94.2 |
| 5,387,927 | 2/1995 | Look et al. | 370/60.1 |
| 5,390,175 | 2/1995 | Hiller | 370/60.1 |
| 5,392,277 | 2/1995 | Bernstein | 370/94.2 |
| 5,425,027 | 6/1995 | Baran | 370/94.2 |
| 5,440,547 | 8/1995 | Easki et al. | 370/60 |
| 5,459,506 | 10/1995 | Bushnell | 348/7 |
| 5,467,342 | 11/1995 | Longston et al. | 370/60.1 |

*Primary Examiner*—Benedict V. Safourek
*Assistant Examiner*—Chau T. Nguyen
*Attorney, Agent, or Firm*—Lowe, Price, LeBlanc & Becker

[57] ABSTRACT

In a network utilizing asynchronous transport mode (ATM) transport and/or switching, the VPI/VCI values have meaning beyond the boundaries of each individual ATM processing element. At the very least, the VPI represents a source identifier related to the provider of the particular program or service carried through the cell stream. The VPI value is maintained constant throughout the network, without translation thereof by any ATM processing element. In the preferred embodiments, the VCI also is maintained constant and serves to identify a particular service or session. For example, for each broadcast service the VCI represents a channel identifier of the program offered by the service provider identified by the associated VPI value. For an interactive session, a VCI value is assigned to the session with a particular subscriber terminal on a dynamic basis. The VCI value for such a session remains valid throughout the network for the duration of that session, without translation or reassignment. The network administration systems rely on the VPI/VCI identification rules to operate and maintain the network and to accumulate various network usage statistics.

50 Claims, 9 Drawing Sheets

PACKET HEADER

| SYNC BYTE | FLAGS | PACKET ID | MISC FLAGS |
|---|---|---|---|

FIGURE 3

188 BYTE MPEG-2 PACKET

| PACKET HEADER | ADAPTATION FIELD (OPT.) | PAYLOAD (IF ANY) |
|---|---|---|

ADAPTATION FIELD (AF)

| AF LENGTH | MISC FLAGS/IND | AF OPTIONS | STUFFING BYTES |
|---|---|---|---|

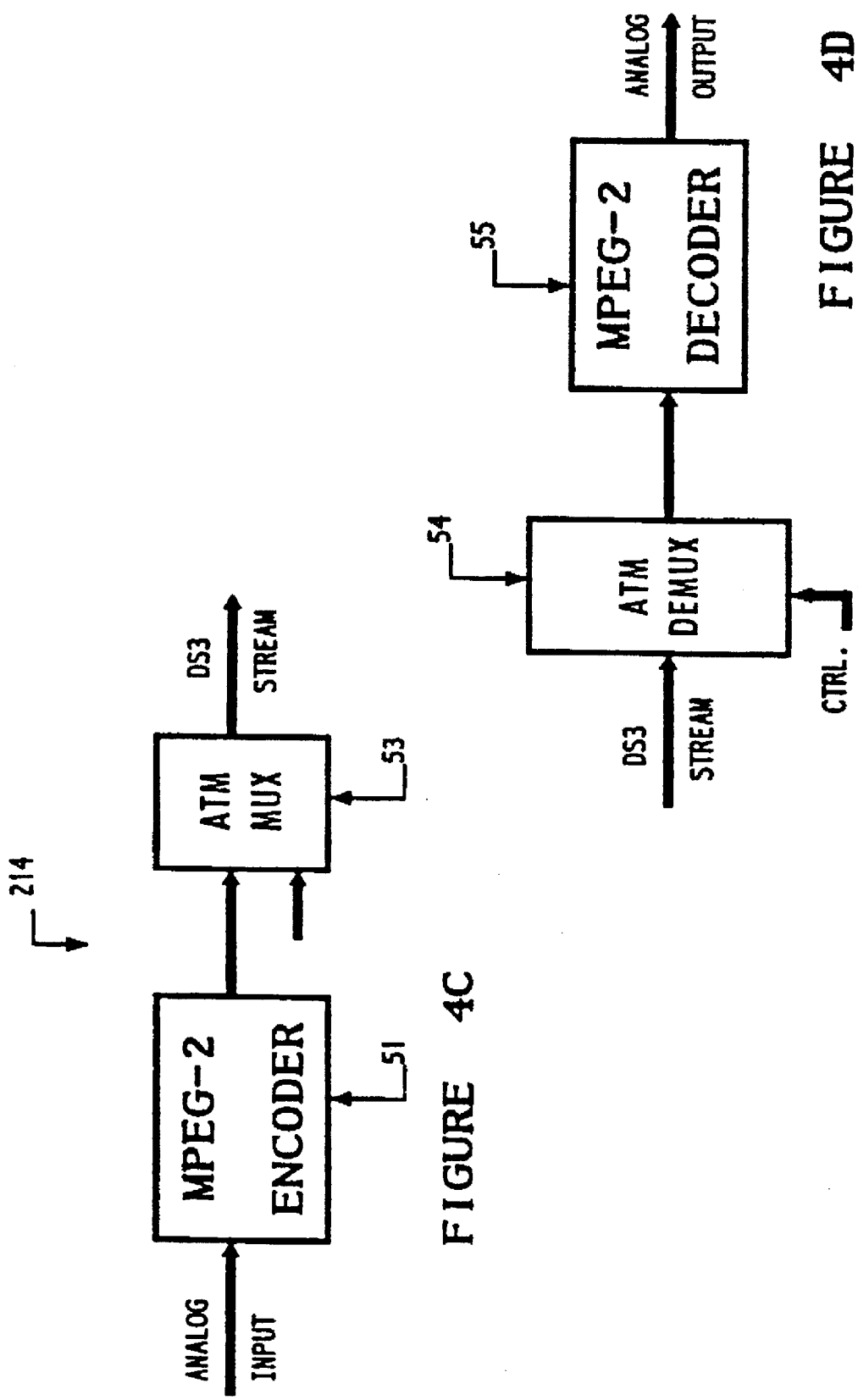

FIGURE 5A

VIP 1 TABLE

| PROGRAM | VIP ID | PROGRAM ID | VPI/VCI |
|---|---|---|---|
| HBO | 1001 | 001 | 1001/001 |
| SHOWTIME | 1001 | 002 | 1001/002 |
| DISNEY | 1001 | 003 | 1001/003 |
| A&E | 1001 | 004 | 1001/004 |

FIGURE 5B

VIP 2 TABLE

| PROGRAM | VIP ID | PROGRAM ID | VPI/VCI |
|---|---|---|---|
| HBO | 1002 | 001 | 1002/001 |
| CINEMAX | 1002 | 002 | 1002/002 |

TIRKS DATA BASE

| CARRIER | VPI/VCI |
|---|---|
| HE01 | 1001/001 |
|  | 1001/002 |
|  | 1001/003 |
|  | 1001/004 |
| HE02 | 1002/001 |
|  | 1002/002 |

| CARRIER | VPI/VCI |
|---|---|
| DS3 01 | 1001/001 |
|  | 1001/002 |
|  | 1001/003 |
|  | 1001/004 |
|  | 1002/001 |
|  | 1002/002 |
| DS3 64 |  |

FIGURE 6

VPI/VCI ADMINISTRATION

TECHNICAL FIELD

The present invention relates to administration (control, usage monitoring, etc.) of a digital broadband network which relies in whole or in part on asynchronous transport mode (ATM) for switching or transport through the network.

BACKGROUND ART

Distribution of full motion video data has evolved from early television broadcasting and cable distribution networks to direct broadcast satellite television. Recently, several different wideband digital distribution networks have been proposed for offering subscribers an array of video services, including true Video On Demand service. The following U.S. Patents disclose representative examples of such digital video distributions networks: U.S. Pat. No. 5,253,275 to Yurt et al., U.S. Pat. No. 5,132,992 to Yurt et al., U.S. Pat. No. 5,133,079 to Ballantyne et al., U.S. Pat. No. 5,130,792 to Tindell et al., U.S. Pat. No. 5,057,932 to Lang, U.S. Pat. No. 4,963,995 to Lang, U.S. Pat. No. 4,949,187 to Cohen, and U.S. Pat. No. 4,506,387 to Walter.

For example, Litteral et al. U.S. Pat. No. 5,247,347 discloses a digital video distribution network providing subscribers with access to multiple Video On Demand service providers through the public switched telephone network. Systems such as described by Litteral et al., however, are limited. The Litteral et al. system for example relies on digital cross connect switching to multiplexers which supply a single broadband channel to a subscriber's premises via the subscriber's twisted wire pair telephone line. The resulting single channel, point-to-point transmissions are effective for interactive type services, but cannot provide viewers with the array of broadcast services now widely available through community antenna type cable television systems commonly known as CATV systems.

An emerging packet switching technology, referred to as asynchronous transfer mode (ATM) switching provides the high speed and flexibility to transport large quantities of information to large numbers of subscribers, in either point-to-point configurations or point-to-multipoint configurations (see e.g. U.S. Pat. No. 5,345,558 to Opher et al). ATM networks communicate all information in cells which comprise a well-defined and size-limited header area and a user information or payload area. Transfer is asynchronous in the sense that the recurrence of cells that contain information from any particular sender is not necessarily periodic. Each sending device using the ATM network submits a cell for transfer when they have a cell to send, not when they have an assigned or available transmission time slot.

The standardized ATM cell format includes a 5-byte header field and a 48-byte information or payload field. The information field is available to the user to transport payload data. The standard defines the header field as carrying information pertaining to ATM functionality, including information for identification of the cells for routing purposes. In particular, the header includes a virtual path identifier (VPI) and a virtual channel identifier (VCI).

An ATM switch comprises a number of switching elements which act together to transport a cell from the input of the switch to the correct output. In the prior art ATM networks, an ATM switch performs two primary tasks: the transport of cells from the input port to the correct output port and translation of VPI/VCI information. In the prior art ATM networks, translation of the VPI/VCI by each switch is important because in such ATM networks the contents of these fields only have local meaning. The same VPI/VCI data is interpreted differently by each switch. Thus, each switch providing transport of cells for a particular communication session translates the VPI/VCI information in the cells relating to that session prior to supplying the cell to an output of the switch.

A number of patents have now suggested transport of video, including broadcast video, using ATM. U.S. Pat. No. 5,260,783 to Dixit discloses a specific technique for digitizing video based on the detected degree of motion and transport of the encoded video information in ATM cell form. U.S. Pat. No. 5,027,400 to Baji et al. discloses a multimedia broadcast system utilizing ATM from the broadcast station all the way to the subscriber terminal. U.S. Pat. No. 5,228,028 to Cucchi discloses a technique for organizing encoded video information to minimize cell loss during ATM transport. The Opher et al. Patent cited above discloses a specific manipulation of the VPI and VCI fields of ATM cells to distinguish cells carrying broadcast information from other cells.

More recently, the assignee of the present application has proposed a number of network architectures for offering a full range of broadcast video, interactive video, narrowband data and voice telephone services. The proposed networks all rely at least in part of ATM transport. Exemplary disclosures of two such networks may be found in copending U.S. patent application Ser. No. 08/304,174, filed Sep. 12, 1994, entitled Level 1 Gateway for Video Dial Tone Networks (attorney docket no. 680-093), the disclosure of which regarding those ATM networks is incorporated herein in its entirety by reference.

To place such video distribution networks using ATM into actual service, a need exists for an efficient manner to manage the network services. For a variety of reasons, a network operating company must be able to determine, monitor and track what programs information service providers put on various ATM channels through the network and how the program cells pass through the network. It may also be useful to track what programs, transported in ATM cell form, a subscriber actually receives and views. To the extent that earlier systems have attempted to monitor network traffic, there has been no use of any of the header information in the ATM cells themselves. Possibly because ATM components translated VPI/VCI values as cells passed therethrough, the VPI/VCI values have not been used to administer network operation.

DISCLOSURE OF THE INVENTION

The present invention addresses the above identified need by providing an efficient way to administer a digital broadband network utilizing ATM transport and/or switching. Specifically, in accord with the present invention, the VPI/VCI values are given life and meaning beyond the boundaries of each individual ATM processing element or switch. At the very least, the VPI represents a source identifier and is maintained as such throughout the network, without translation thereof.

In the preferred embodiments, the VCI also is maintained throughout the network, without translation, and the VCI represents a program or channel identifier. For a broadcast service, the VCI represents the individual program offered by the service provider identified by the associated VPI value. For each IMTV session, a VCI value is assigned to the session with a particular DET on a dynamic basis. The VCI value for such a session remains valid throughout the network for the duration of that session, without translation or reassignment.

The network administration systems rely on the VPI/VCI identification rules outlined above to operate the network, perform maintenance related functions and track network usage.

Thus, in one aspect, the invention relates to a communication system comprising information sources operated by service providers, a plurality of subscriber terminals, and a communication network. The network selectively supplies signals from one of the information sources to one of the subscriber terminals. The network includes at least one asynchronous transport mode (ATM) processing element. The ATM processing element may be an ATM switch or some other ATM device for transport. The ATM processing element transports the signals from the one information source through at least a portion of the communication network in a sequence of ATM cells. Each ATM cell in the sequence comprises a payload section containing a portion of the signals from the one information source. In accord with the present invention, a header in each cell contains the VPI assigned to identify the service provider and a VCI value. A network control element administers the operation of the communication network, based at least on the VPI value. The VPI remains constant. Consequently, ATM cells pass in sequence through the ATM processing element with the VPI in each cell, and the cells are output by the ATM processing element with the same VPI still present in each cell. The present invention also relates to a method of administering a network based on an assigned constant VPI value.

In another aspect, the present invention relates a method of administering broadcast services by assigning VPI values to broadcast service providers and assigning VCI values to each broadcast program each service provider will offer through the network. ATM cells for each broadcast program service pass through an ATM cell processing element. The ATM cell processing element keeps the VPI and VCI values in the cell headers constant. The network receives a selection of one of the broadcast programs offered by one of the service providers from one subscriber terminal. In response, the network supplies information from cell payloads of a cell stream, the cells of which have headers containing the VPI assigned to the one service provider and the VCI assigned to the one broadcast program, to the one terminal.

The preferred implementation utilizes a network comprising an ATM backbone network and a local loop distribution network. Although other local loop distribution networks may be used, the preferred implementation transports bit streams carrying a multiplex of ATM cell streams to each subscriber terminal. For example, to supply one broadcast program, the serving node of the local loop distribution network (identified as a host digital terminal or 'HDT') supplies the bit stream carrying the cells for the program to the terminal and supplies the terminal with the VPI/VCI for the program, to permit the terminal to decode the information from the cells carrying information for the program.

The network of the present invention can transport a wide variety of information in the manner described above. For example, the broadcast programs may be video, audio or data. For video or other broadband services, the information is digitized and packetized. An ATM multiplexer or the like then encapsulates the packets in the payloads of a number of ATM cells, adds the headers containing the assigned VPI and VCI and supplies the ATM cells to the ATM cell processing element.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF DRAWINGS

FIG. 3 shows an exemplary structure of an MPEG-2 type data packet.

FIG. 4C is a simplified block diagram of a system for encoding information for ATM cell transport using the adaptation procedures of FIGS. 4A and 4B.

FIG. 4D is a simplified block diagram of a system for decoding information from an ATM cell transport stream by reversing the adaptation procedures of FIGS. 4A and 4B.

FIGS. 5(A) and 5(B) are simplified representations of a portion of a VIP profile database maintained as management data in the system of FIG. 1.

FIG. 6 is a simplified representation of a portion of a trunk inventory database for broadcast services maintained as management data in the system of FIG. 1.

BEST MODE FOR CARRYING OUT THE INVENTION

The present invention involves administration of a network, particularly for digital broadband services, using the VPI and VCI values as source identifiers. Specifically, the inventive networks use the VPI value to identify the service provider and preferably use the VCI value to identify a particular channel (broadcast) or session (IMTV). The cells pass through the ATM processing element(s) of the network without changing the VPI/VCI values. The inventive administration concepts apply to a variety of networks which rely in whole or in part on ATM switching or transport. For this reason, it is helpful to begin with a fairly generic overview of a network and the administration thereof using the VPI and VCI values in accord with the present invention. Detailed discussions of ATM processing in accord with the present invention and of a preferred network architecture will follow.

Network Overview

Figure 1:
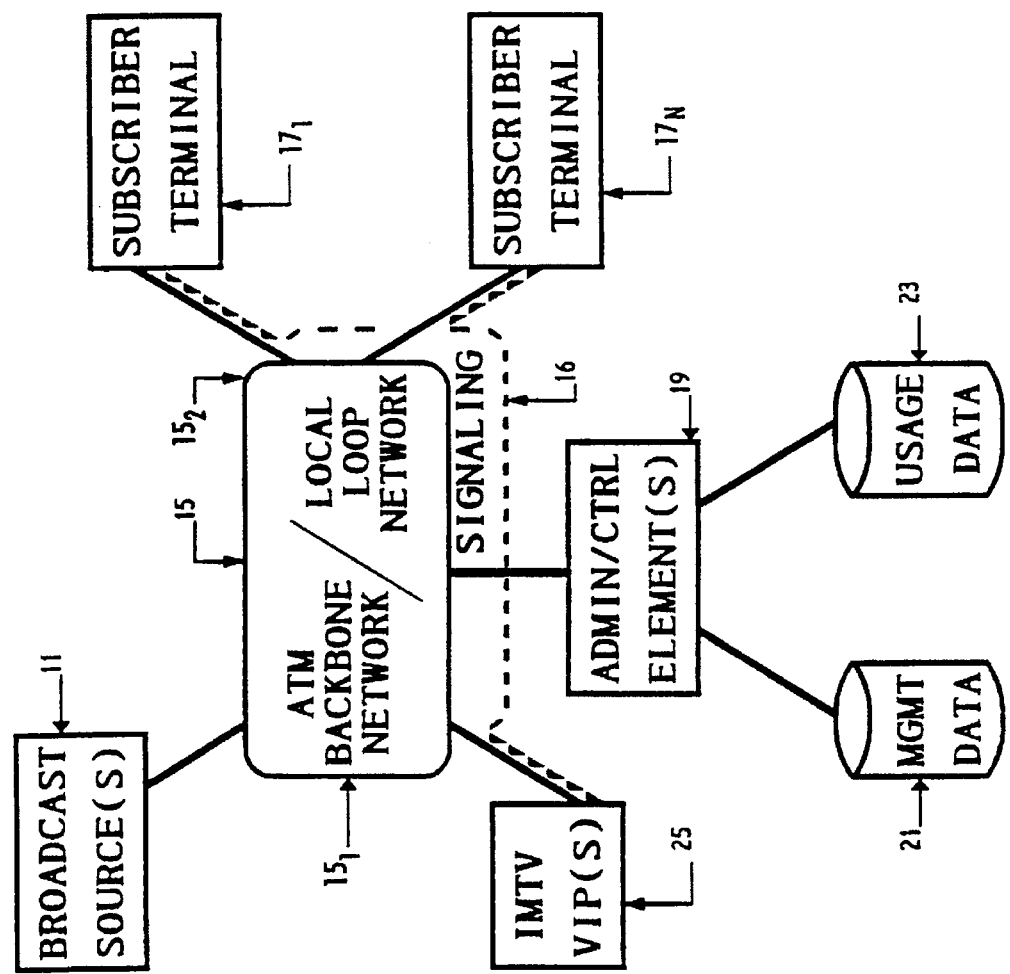
FIG. 1 is a simplified block diagram of a communication network using at least some ATM transport to provide a wide range of broadcast and interactive multi-media services.

FIG. 1 is a high level functional diagram of a network providing broadcast and interactive broadband services, using ATM cell transport. The preferred embodiment illustrated in FIGS. 7A and 7B and discussed later utilizes end-to-end ATM transport, i.e. with ATM cells for at least the downstream broadband transmissions going all the way to the terminal. Other networks which may rely on the VPI/VCI administration of the present invention, such as the hybrid-fiber-coax network shown in FIG. 4 of the above cited copending U.S. patent application Ser. No. 08/304,174, utilize ATM transport in the backbone network only and use some other transport technology for the local loop distribution to the subscriber's terminal. The VPI/VCI administration techniques of the present invention can be applied to any of these networks utilizing ATM, particularly ATM transport of broadcast video.

FIG. 1 therefore provides a generic illustration of the transport network 15. As shown, the network 15 comprises an ATM backbone network $15_1$ and one of several possible local loop distribution networks $15_2$. In the later discussed preferred embodiment, the local loop distribution network $15_2$ utilizes switching nodes referred to as host digital terminals (HDT's) which transport ATM cell streams through to the relevant subscribers' terminals 17.

In some forms of the network 15, the local loop distribution nodes may strip off the ATM cell headers and convert the payload data to some other format for actual transmission to the subscriber terminals. In the preferred embodiment, the local loop distribution network supplies the ATM cells from each broadcast to each terminal $17_1$ to $17_N$ from which a subscriber requested the particular broadcast service.

In ATM, transfer is asynchronous in the sense that the recurrence of cells that contain information from any particular sender is not necessarily periodic. Each device using the ATM network submits a cell for transfer when they have a cell to send, not when they have an assigned or available transmission time slot. However, the ATM cells may ride in synchronous slots on a high-speed time division multiplexed media, such as a SONET optical fiber. ATM allows any arbitrary information transfer rate up to the maximum supported by the ATM network, simply by transmitting cells more often as more bandwidth is needed.

In ATM, information is organized into cells having a fixed length and format. Each cell includes a header, primarily for identifying cells relating to the same virtual connection, and an information field or "payload". Under presently existing ATM standards, a 53 byte ATM cell includes a cell header consisting of 5 bytes and a payload consisting of 48 bytes of payload data (see FIG. 2). The ATM cell header information includes a virtual path identifier (VPI) and a virtual circuit identifier (VCI) to identify the particular communication to which each cell relates. The specific format of the ATM cell is described, for example, in the ATM User Network Interface Specification, Version 3.0, published by The ATM Forum, Mountain View, Calif., also published by Prentice Hall, the disclosure of which is incorporated in its entirety by reference.

Figure 2:
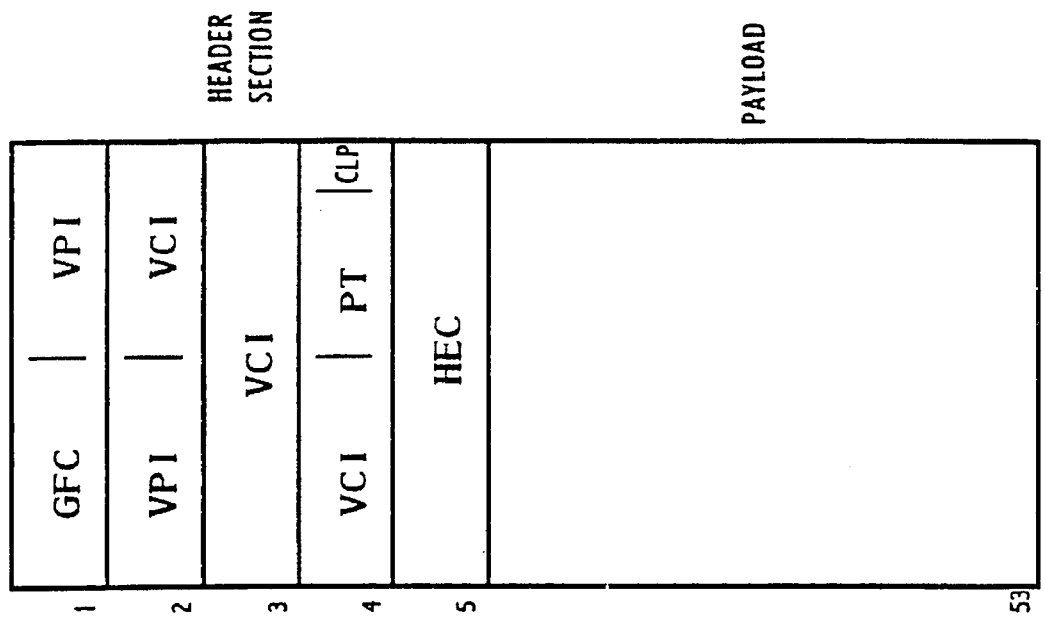
FIG. 2 shows an exemplary structure of an ATM cell.

FIG. 2 depicts a typical ATM cell format. The ATM cell includes a header section and a payload section. The first 8-bit byte of the header section includes a 4-bit GFC word which provides access control. The first byte of the header section also includes the lower four bits of an 8-bit virtual-path identifier (VPI). The second byte of the header section includes the upper four bits of the VPI and the first four bits of a 16-bit virtual circuit identifier (VCI). The third byte includes the next eight bits of the VCI. The fourth byte of the header section includes the last four bits of the VCI; a 3-bit payload type indicator (PT); and a cell loss priority bit (CLP). The fifth byte of the header section includes an 8-bit header error check (HEC) word. Bytes 5 to 53 carry information and form the ATM cell payload section.

In the network illustrated in FIG. 1, a number of broadcast video information providers (VIP's) operate one or more broadcast sources 11, which have a one-way connection (downstream) to an ATM backbone network $15_1$ for distribution of broadcast cells to various nodes of the local distribution network $15_2$. Each source supplies a number of broadcast programs to the network $15_1$ in ATM cell form.

A source 11 will supply the ATM cells containing digitized broadcast information for a broadcast service to the network 15 at all times that the service is to be available through the network. For video services, for example, the original source video material is digitally encoded and compressed, and the digital video information is packetized in ATM cells for transport through the network $15_1$. The ATM cells can represent service signals for broadband services (e.g. video), audio services (e.g. radio) or data services (e.g. text).

The ATM network $15_1$ may include one or more ATM switches and/or one or more devices for multiplexing and demultiplexing ATM streams. For broadcast, the ATM network supplies cells from one input point to multiple output points, e.g. to multiple nodes of the local loop distribution network $15_2$. ATM networks route cells based on the VPI and/or VCI values carried in the header section 30 of each cell. The present invention additionally utilizes and tracks the VPI and VCI values of cells transported through the networks for a variety of network management and accounting purposes.

Returning to the exemplary network of FIG. 1, when a subscriber selects a specific broadcast program, the subscriber's terminal sends a request signal to an appropriate administration and/or control element 19. As illustrated by the dotted lines in FIG. 1, all or part of the signaling link may go through a separate signaling network 16. Alternatively, the terminal devices may transmit the signaling message upstream at least in part through the ATM network $15_1$.

In response to the request for a broadcast service, the administration and/or control element 19 identifies the ATM cell stream for that service from stored management data 21. The administration and/or control element 19 then instructs the ATM network $15_1$ to supply the ATM cells for the specific broadcast service (having a particular VCI/VPI value) to a node of the local loop distribution network $15_2$ serving the subscriber. The control element 19 also instructs the local loop distribution network $15_2$ to deliver information from those cells to the requesting subscriber's terminal. In the preferred embodiment, the local loop distribution network $15_2$ will actually supply a digital bit stream containing the identified ATM cells and other cells to the particular terminal and instruct the terminal which cells to capture and process. The administration and/or control element 19 will store usage data identifying the requested service in a database 23, for billing purposes, for audience surveys, maintenance purposes, etc.

In response to the instructions from the administration and/or control element 19, the network 15 uses VPI/VCI values included in the ATM cells to route ATM cells, at least through the ATM subnetwork $15_1$, and to supply information from those cells to the appropriate terminal. Depending on the precise transport architecture, it may also be necessary to inform the terminal of the VPI/VCI value to capture and process the correct cells. The ATM cell processing elements (switches, multiplexers, etc.) at the nodes of the ATM backbone network $15_1$ do not translate the VPI value or the VCI value for the broadcast services.

As discussed in more detail below, the VPI value in a broadcast service cell stream identifies the broadcast VIP providing the service, and at least in the preferred embodiment, the VCI value identifies the broadcast channel carrying the particular broadcast program service. The management data identifies the ATM cell streams for the broadcast services by VIP and channel number using the VPI and VCI values, respectively. Similarly, when the administration and/or control element 19 stores usage data in database 23, that control element utilizes the VPI value to identify the VIP and the VCI value to identify the particular program service channel. The control element therefore stores the VPI/VCI value along with other relevant usage data (e.g. an identification of the subscriber and/or subscriber's terminal and the start time and duration of reception of the program identified by the VPI/VCI value).

For interactive multi-media television (IMTV) type services, the system will include a number of video information providers (VIP's) 25. As discussed in more detail later, each IMTV VIP 25 operates some form of source or server for transmitting information in ATM format downstream through the network 15 to a terminal which has requested an interactive session with the particular VIP. Each IMTV VIP 25 also operates some form of control element (referred to later as a level 2 gateway) which provides two-way signaling communications to the administration and/or control element 19 and provides two-way signaling communications to the terminals of subscribers who have established interactive sessions with the VIP. The VIP's control element controls operations of the server in response to instructions from the administration and control element 19 and various information input by subscribers through their respective terminals $17_1$ to $17_n$.

The signaling communications for the IMTV VIP's 25 may go through a separate signaling network, or the signaling communications for those VIP's may go through the ATM network 15. The IMTV VIP's will typically offer broadband interactive services, such as video on demand, video based home shopping and video games, but these VIP's may offer other interactive services, such as interactive text services and interactive audio services (e.g. voice mail and audio on demand).

To establish a session with one of the interactive VIP's 25, a user operates his or her terminal 17 to interact with the appropriate administration and/or control element 19 to identify the particular VIP of choice. The control element for this function may be the same as or separate from the element which actually controlled the broadcast service. Once the subscriber selects the VIP 25, the control element 19 utilizes management data 21 to instruct the ATM backbone network $15_1$ and the local loop network $15_2$ to establish at least a broadband downstream link between the VIP's server and the particular subscriber's terminal and provides any necessary information to the IMTV VIP's equipment.

If the system uses a separate signaling network 16, the control element 19 or the VIP's control equipment (level 2 gateway) would initiate a parallel two-way signaling link from the VIP's control equipment to the subscriber's terminal. If the signaling rides on the ATM network 15, the instructions from the administration and/or control element 19 to that network would also establish the signaling link between the VIP control element and the subscriber's terminal. Once the broadband and signaling links are up and running, the subscriber instructs with the VIP's equipment to obtain a particular desired service, e.g. to order a video of choice.

For interactive services, the system of the present invention again utilizes the VPI value in the ATM cell stream to identify the VIP, at least for the downstream service transmissions. At initial set up, the VIP's equipment will be programmed to output only cells having the VPI value assigned to the particular VIP. During each interactive call set up, the administration and/or control element 19 will negotiate and agree that the VIP's equipment is to use an assigned VCI value for the particular session. For the duration of the interactive session, the VIP's equipment will supply cells to the network $15_1$ having the assigned VPI/VCI value. The administration and/or control element 19 will also instruct the ATM network $15_1$ to route all cells with the assigned VPI/VCI value to the node of the local loop distribution network $15_2$ serving the subscriber. The control element 19 also instructs the local loop distribution network $15_2$ to deliver information from those cells to the requesting subscriber's terminal.

If necessary, the administration and/or control element 19 can supply the VPI/VCI value to the subscriber's terminal for use in capturing and processing the appropriate ATM cells. The administration and/or control element 19 will also store the VPI/VCI value along with other relevant usage data (e.g. an identification of the subscriber and/or subscriber's terminal and the length of the session) in the usage database 23. In network implementations wherein the signaling between the subscriber terminals, the administration and control elements and any control elements operated by the IMTV VIP's utilize the ATM network $15_1$, the signaling channels would be administered using similar VPI/VCI rules.

ATM Cell Processing

The preferred embodiments of the present invention provide video type broadband services, both for broadcast and for IMTV type services. The video information, accompanying audio information and certain related data are encoded using a standardized digitization and compression technique, such as MPEG (moving pictures expert group) or DIGICIPHER™ and then encapsulated into ATM cells. FIG. 4C provides a simplified diagram of the encoder functionality for preparing original analog source signals for ATM transport through the network. As shown, the encoder 214 comprises an MPEG-2 encoder 51 and an ATM multiplexer or 'mux' 53. The MPEG-2 encoder 51 supplies a stream of MPEG-2 packets to an ATM multiplexer, either directly as shown for real-time type broadcast services or through some form of storage device or server (not shown) for other types of broadcast and IMTV services. As used here, the ATM multiplexer performs an ATM adaptation function which converts the input information into ATM cells and performs a multiplexing function to combine cells streams carrying payload data from a number of encoders similar to 51 into one higher rate bit stream.

MPEG is a bi-directional predictive coding compression system, utilizing discrete cosine transformation (DCT) processing. Picture elements are converted from spacial information into frequency domain information. Compression begins by discarding information to which eyes are insensitive. From the remaining information, the encoder will develop reference (I) frames, predictive (P) frames and delta (B) frames.

The number of frames to be coded for each I frame is set in the standardized MPEG syntax, e.g. one reference frame for each group of fifteen frames, or every half second. A prediction is made of the composition of a video frame, termed a P frame, to be located a specific number of frames forward and before the next reference frame, this specific number also is set in the MPEG syntax. Information from previous video frames as well as later video frames is used in formulating the prediction. "Delta" or "B frame information is developed for coding the video frames between the actual and predicted frames, also by looking at frames in both directions. Rather than updating a whole frame, only the changed (or delta) information is provided for the delta video frames. Thus the total information coded, and then transmitted, is considerably less than that required to supply the actual information in the total number of frames. Typically, between I frames, the frame sequence consists of a repetitive succession of two B frames followed by one P frame.

The MPEG-2 standard provides a standardized format for packetizing the compressed audio and video information and for transporting other data. Under the MPEG-2 standard, incoming individual video signals and related audio signals are encoded and packetized into respective Video and Audio Packetized Elementary Streams (PES). The video and audio PES's from one or more sources of video programming may be combined into a transport stream for transmission or storage.

Each frame of compressed program information (audio, video or data) is broken down into a series of transport packets. Although the frames can vary in length, e.g. between a full reference I-frame and a delta B-frame, the transport packets have a fixed 188 byte size. Thus, different frames are broken down into different numbers of MPEG transport packets. For example, in a 6 Mb/s encoding system, a group of frames consisting of a total of 15 frames for one-half second of video (one I frame and a number of P and B frames), breaks down into 4000 transport packets.

As shown in FIG. 3, each 188 byte transport stream packet consists of two sections, a 4 byte packet header section, an optional adaptation field and a payload section. The header information includes, inter alia, a synchronization byte, a variety of different flags used in reconstruction of the frames, and a thirteen bit program identification (PID) number. PID value 0 is reserved as an indication that the packet includes program association table data. PID value 1 is reserved for identification of packets containing conditional access data, such as encryption information. Other program identification numbers are utilized to identify transport packets with the program source from which they originate.

Periodically, the transport packet for each program will also include a program reference clock (PRC) value within the optional adaptation field. In a typical 6 Mb/s MPEG encoding system, the PRC is present in only 10 out of every 4000 video transport packets.

When included, the optional adaptation field includes a section for miscellaneous flags, such as discontinuity counter, private data flag, etc. One of the possible flags carried in this portion of the adaptation field is a program clock reference (PRC) flag.

The adaptation field (AF) also includes a section designated for AF options. One of the options this section may carry is the PRC value.

On decompression, the decoder in sequence reconstructs the frames for a particular program from packets bearing the appropriate PID value, uses the reference frame to form the prediction frames, and then uses the prediction frames and delta information to construct full frames from the delta frames.

Figure 4A:
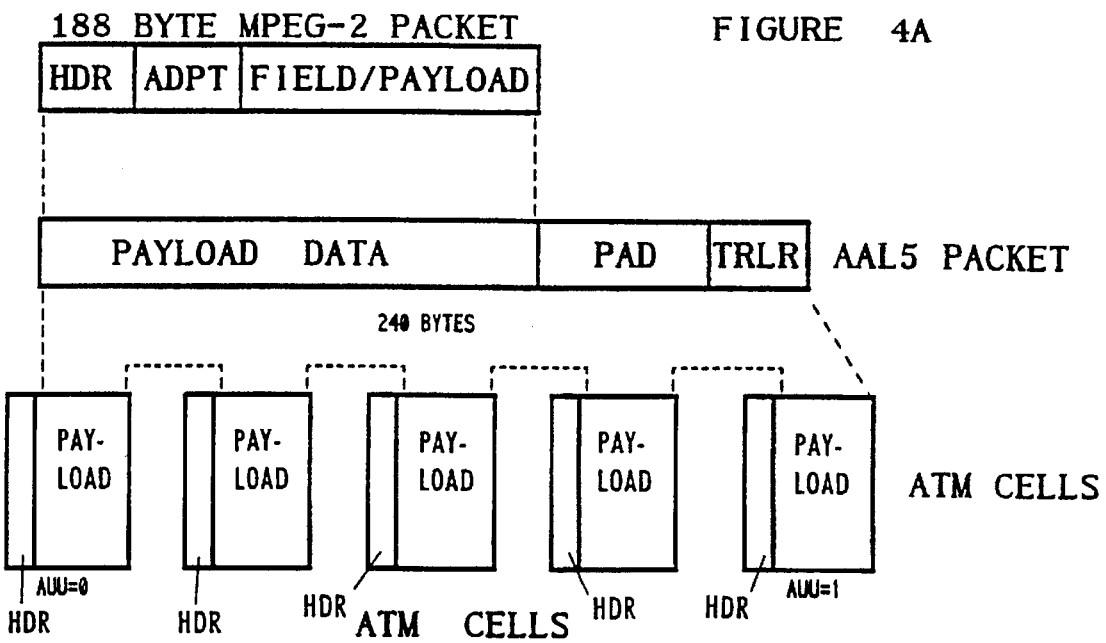
FIG. 4A illustrates a five-cell adaptation for mapping an MPEG-2 packet into ATM cells.
Figure 4B:
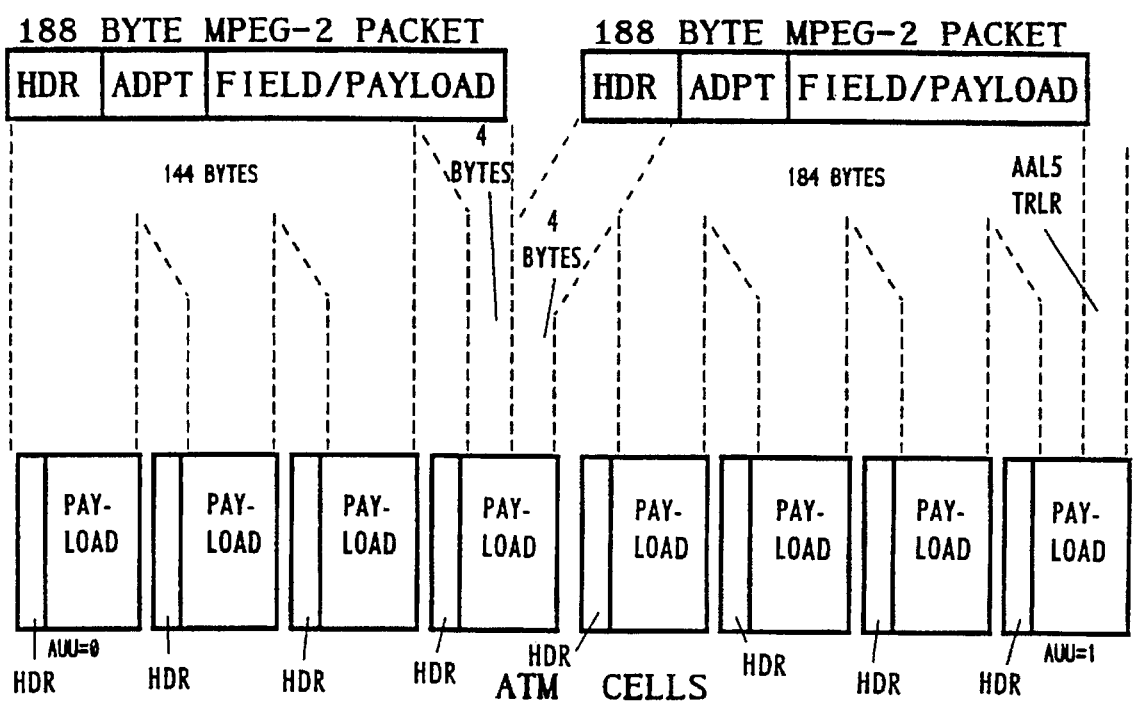
FIG. 4B illustrates an eight-cell adaptation for mapping two MPEG-2 packets into ATM cells.

In ATM based networks of the type under consideration here, the MPEG 2 bit streams are converted into cellular payload data, and cell headers are added. As noted above, each MPEG packet consists of 188 bytes, whereas each ATM cell includes 48 bytes of payload data. The ATM multiplexers which map the MPEG packets into ATM cells use two different adaptations to encapsulate MPEG 2 packets in ATM cells. The first adaptation maps one 188 byte MPEG packet into five ATM 48 byte cell payloads (FIG. 4A). The second adaptation maps two 188 byte MPEG packets into eight ATM 48 byte cells payloads (FIG. 4B).

MPEG packets of 188 bytes map efficiently into ATM cells if pairs of packets are mapped into 8 cells. However, a delay is imposed on mapping of a first cell while waiting for the second cell in the pair. To minimize jitter at the decoder, the packets carrying the PRC need to be encoded and transported quickly. To avoid delaying first packets containing a PRC while processing a second packet, the present system maps first packets containing a PRC immediately, using the five cell adaptation procedure. In a typical video transmission, the PRC is present in approximately 10 out of every 4000 MPEG-2 packets. Also, at least some of those 10 packets will arrive as the second packet of a pair. Consequently, only a very small number of packets are mapped using the less efficient 5-cell adaptation.

As shown in the simplified block diagram of FIG. 4C, an MPEG encoder 51 supplies a stream of MPEG-2 packets to an ATM multiplexer 53. The ATM multiplexer 53 checks the flags in the adaption field (if any) in the first packet to determine if that packet includes a program reference clock (PRC) value. The ATM multiplexer applies the 5 cell adaptation to first packets containing a program reference clock (PRC) value. The ATM multiplexer applies the 8 cell adaptation to pairs of cells wherein the first packet does not contain a program reference clock (PRC) value.

For each type of adaptation, the ATM multiplexer 53 will first convert the source packet or pair of packets into a single ATM adaptation layer 5 (AAL5) packet. As part of this conversion, the mux will add an AAL5 trailer, either at the end of the single packet or at the end of the pair of packets. The actual trailer consists of 8 bytes of data, including 4 bytes of cyclic redundancy check (CRC) data, user information (e.g. length), etc.

For a 5 cell adaptation (FIG. 4A), the AAL5 packet consists of a single MPEG packet of 188 bytes and an 8 byte AAL5 trailer, for a total of 196 bytes. To map this packet into ATM cells, the AAL5 packet is also padded with 44 bytes after the trailer, for a total of 240 bytes of payload data. The ATM mux 53 breaks the AAL5 packet (240 bytes) down into five 48-byte payloads (SAR-PDU) and attaches appropriate 5 byte headers to each payload to thereby form five 53-byte ATM cells.

The header of all five of the ATM cells will contain the VPI/VCI value assigned to the particular communication. For example, for a broadcast service, the assigned VPI value would identify the VIP providing the service, and the VCI value would identify the particular one of the VIP's program service channels for which the cells transport MPEG data. The header of the first of the five cells also has a bit designated "AAU" which has a value of "0" to identify that cell as the first cell. The header of the fifth cell will have an AAU bit value of "1" to identify that cell as the last cell.

For an 8 cell adaptation, the AAL5 packet consists of two MPEG packets of 188 bytes and an 8 byte AAL5 trailer, for a total of 384 bytes. The ATM mux 53 breaks the AAL5 packet (384 bytes) down into eight 48-byte payloads and attaches appropriate 5 byte headers to each payload to thereby form eight 53-byte ATM cells. The AAL5 layer is omitted from FIG. 4B for simplicity. That drawing shows the mapping of two MPEG packets into eight ATM cells with the inclusion of the AAL5 trailer in the last cell.

The header of all eight of the ATM cells will contain the VPI/VCI value assigned to the particular communication.

Continuing the above example, if the MPEG data relates to the same broadcast program service, the assigned VPI value would identify the VIP providing the service, and the VCI value would identify the same one of the VIP's program service channels as in the above discussed example of the five-cell adaptation. The header of the first of the eight cells will have an AAU bit value of "0" to identify that cell as the first cell. The header of the eighth cell will have an AAU bit value of "1" to identify that cell as the last cell.

As noted above, each cell of a particular stream will have a header which contains a virtual path identifier/virtual circuit identifier (VPI/VCI) to identify the virtual circuit that the cells pertain to. All MPEG packets for a given program, whether video, audio or data, will be mapped into ATM cells having the same VPI/VCI. Conversely, cells having a given VPI/VCI will contain data corresponding to only one identified program. Thus, in the above broadcast example, the cells from the one broadcast program all contain the same VPI/VCI value whether the five-cell adaptation was used or the eight-cell adaptation was used. In accord with the present invention, for broadcast services, the VPI/VCI value in each cell identifies the provider (VIP) and the particular channel. For IMTV services the VPI value in each cell identifies the provider (VIP), and the VCI value may be used to at least partially identify the particular IMTV session.

The ATM mux 53 will process MPEG-2 packet streams for up to six programs. In addition to converting the MPEG-2 packets for each program to ATM cells, the mux 53 will combine the cells from the six programs into a single DS3 bit stream. In mapping cells from multiple programs to ATM cells and combining cell streams into a signal bit stream, it is necessary for the mux 53 to map the PID value from each MPEG-2 packet into the correct VPI/VCI value for the corresponding program. The ATM mux 53 therefore is programmed to recognize the PID values of packets for each program and apply the adaptation techniques discussed above relative to FIGS. 4A and 4B and to map the PID values into the assigned VPI/VCI values.

At the network node which terminates the ATM cell transport, a receiver captures each ATM cell having a specified VPI/VCI. In the preferred embodiment, the network 15 transports ATM cells through to the subscriber terminals 17, therefore the receiving node would be the subscriber's terminal, referred to later as the subscriber's digital entertainment terminal (DET).

FIG. 4D provides a simplified diagram of the decoder functionality of a receiver for reconstructing the original analog source signals from the ATM cell stream transported through the network. As shown, an ATM demultiplexer or 'demux' 54 receives a multiplexed ATM cell stream carrying ATM cells relating to a number of programs or sessions. The ATM demux 54 performs two functions, demultiplexing the combined stream to recover cells relating to one communication and ATM to MPEG reverse adaptation to strip off the ATM cell headers and reconstruct the MPEG packets. In the illustrated example, as part of the demultiplexing function, the demux 54 captures all packets having a single specified VPI/VCI value and provides those packets to a decoder 55.

Other demultiplexing functions are possible depending on where the demux fits into the overall network architecture. For example, the demux 54 could provide multiple outputs to multiple decoders. For example, the hybrid fiber coax based system disclosed in FIG. 4 of the above-cited Ser. No. 08/304,174 application, an ATM packet handler performs the ATM demux function. That packet handler provides multiple output rails each of which carries a combined MPEG packet stream for 4 programs for broadcast in one RF channel. The DET captures a combined stream from an RF channel, and an MPEG decoder in the DET processes packets for one of the 4 programs based on PID value recognition. In the preferred network embodiment discussed below with regard to FIGS. 7A and 7B, the ATM demux 54 and the MPEG-2 decoder are elements of the DET 238.

As part of the reverse adaptation functionality, the demux buffers cells until it finds a cell having an AAU value of "0" in its header (first cell) and another cell having an AAU value of "1" in its header (last cell). The demux counts the number of cells from first to last to determine the type of adaptation used to map cells.

If the demux has captured five cells, the demux pulls out the payload data and uses the CRC data do check for errors. If there are no errors, the original MPEG packet is reconstructed from the appropriate bytes of payload data from the first four cells. Similarly, if the receiver has captured eight cells, the receiver pulls out the payload data, does the CRC based error check, and if there are no errors, the original pair of MPEG packets is reconstructed from the appropriate bytes of payload data from the eight cells.

VPI/VCI Assignment

Normally, VPI/VCI values serve as routing information through the ATM switching fabric of the network. In accord with the present invention, various network databases for management, accounting, etc. also use the VPI/VCI values to identify the VIP's and the channels offered by each of the VIP's. Each VPI/VCI combination is unique, throughout the network. For a service provider or VIP to offer services through the network, the provider therefore must be assigned a VPI value and one or more VCI values. The network service company will assign VPI and VCI values. The network operating support systems will develop databases for administering the network using the VPI and VCI values and will download management data from appropriate portions of the databases to various elements of the network.

One database used in accord with the present invention is a VIP profile database which contains various information relating to the VIP and the services offered by the VIP. FIG. 5 shows a simplified example of a portion of a VIP profile database concentrating on the portion of the database most relevant to VPI/VCI administration. As shown, for each broadcast service VIP, the VIP profile in the database includes a record of the channels that VIP offers through the network. The VIP identifier corresponds to a unique VPI value assigned to the particular VIP. Each broadcast channel the VIP offers is assigned a VCI value.

In practice, when each new VIP first contacts the network service provider and asks to provide services through the network, the network operating company will assign the VIP an identifier, which translates directly into a VPI value. The VPI assignment is initially recorded in the network operations support systems (OSS) and is used to begin to populate the VIP profile database. In the example shown in FIG. 5, the first VIP would be given the VIP ID 1 and would have a four digit VPI value of 1001. The second VIP would be given the VIP ID 2 and would have a four digit VPI value of 1002. If there were fifteen VIP's, the network operator would assign VIP ID 15 and VPI value 1015 to the fifteenth VIP.

Each VIP offering broadcast services will negotiate with the network provider for the number of channels the VIP needs to carry the services that VIP intends to offer. From time to time, the VIP may request to add or drop channels, based on user demand and other business concerns. For each channel the VIP intends to use for broadcast programming, the network operating company will assign a program identifier which translates directly into a VCI value. The VCI assignment is initially recorded in the network operations support systems and used to populate or update the relevant portion of the VIP database.

For example, as shown in FIG. 5, the first VIP has a VIP ID of 1 and a VPI value of 1001. For simplicity, assume that VIP will broadcast four program services: (1) HBO, (2) Showtime, (3) Disney and (4) ANE. The network operating company assigns those four new programs four new program ID's in numerical order, 001 to 004, respectively. The program ID's translate directly into VCI values. Consequently, the VPI/VCI for that VIP's HBO channel is 1001/001, the VPI/VCI for that VIP's Showtime channel is 1001/002, the VPI/VCI for that VIP's Disney channel is 1001/003, and the VPI/VCI for that VIP's ANE channel is 1001/004. As shown in FIG. 5, the VIP profile database maintains a profile table for the first VIP which includes the various identifiers of the VIP and the VIP's programs and the VPI/VCI values for each of the VIP's programs.

After completion of this assignment, the network operating personnel inform the VIP of the assigned VPI/VCI values for each channel. The VIP programs this information into the VIP's ATM encoding/multiplexing equipment, e.g. into one or more ATM mux 53. When the VIP's equipment begins broadcasting, the ATM mux will recognize PID values in MPEG packets for each program and will apply the assigned VPI/VCI values to the cells carrying the payload data for the corresponding programs. The network operator also supplies information from the VIP profile database as needed to various nodes of the network 15.

When another VIP wants to acquire services, the network operating company assigns VPI and VCI values and develops the necessary management data at the various points in the network in essentially the same manner as for the first VIP. In the simplified example shown in FIG. 5, the second VIP has a VIP ID of 1002. For simplicity, assume that VIP will broadcast two programs two new program services: (1) HBO, (2) and Cinemax. The network operating company assigns those two new program ID's in numerical order, 001 and 002, respectively. The program ID's translate directly into VCI values, therefore the VPI/VCI for that VIP's HBO channel is 1002/001, and the VPI/VCI for that VIP's Cinemax channel is 1002/002. As shown in FIG. 5, the VIP profile database maintains a profile table for the second VIP which includes the various identifiers of the VIP and the VIP's programs and the VPI/VCI values for each of the VIP's programs.

After completion of the assignment of VPI/VCI values to the second VIP, the network operating company informs the VIP of the assigned VPI/VCI values for each channel. The second VIP programs this information into that VIP's ATM encoding/multiplexing equipment, e.g. into one or more ATM mux 53. When the VIP's equipment begins broadcasting, the ATM mux will apply the assigned VPI/VCI values to the cells carrying the payload data for the corresponding programs offered by the second VIP. The network operations support systems (OSS) also supplies information from the VIP profile database as needed to various nodes of the network.

In the preferred embodiment discussed below with regard to FIGS. 7A and 7B, the network will transport at least 384 broadcast program channels. In practice, there are more than two VIP's offering broadcast services, and the network will sell channel capacity to each VIP to offer a larger number of program services than that illustrated in FIG. 5, i.e. to maximize usage of the 384 available channels.

Although not shown in FIG. 5, the VIP profile database will contain a variety of other information relating to the VIP, the individual services offered by the VPI and the ATM channels carrying that VIP's services. For simplicity, most of the examples discussed below will relate to a fixed rate broadband service at 6 Mb/s. However, in practice, the network of the preferred embodiment can offer services at least at several predefined rates (e.g. 1.5., 3 and 6 Mb/s) and may actually offer variable rate services up to a fixed maximum value. In such networks, one example of other information maintained in the VIP profile database for broadcast services would relate to the bandwidth that the VIP purchases for each of that VIP's broadcast services.

As part of the operations and support systems 244 (FIG. 7B), the network administrator maintains a 'TIRKS' database which serves as the provisioning system for the network. In this instance, TIRKS stands for 'Trunk Inventory Record Keeping System'. In practice, the operations support personnel enter the VIP profile information including the VPI/VCI assignments in the TIRKS database and manipulate that database to define necessary routing tables for transport of the VIP's broadcast program channels through the network. The TIRKS database then outputs appropriate information for programming the various ATM processing nodes of the network.

FIG. 6 provides an example of the TIRKS database listing for the two VIP's in the example discussed above relative to FIG. 5. As shown in FIG. 6, the TIRKS database essentially correlates trunk identifiers for the various carrier facilitates throughout the network with the VPI/VCI values for the signals on each respective trunk. The output of each encoder 214 is identified by 'headend' or HE number. Each HE signal output by an encoder is a DS3 bit stream. As shown in the left table in FIG. 6, the four broadcast programs from the first VIP have VPI/VCI values of 1001/001, 1001/002, 1001/003, and 1001/004 and all appear on encoder output HE01. The two broadcast programs from the second VIP have VPI/VCI values of 1002/001 and 1002/002 and appear on encoder output HE02. If either or both VIP's had additional encoders 214, the TIRKS database would include the HE number assignments and VPI/VCI values for the additional programs output by each such additional encoder.

The TIRKS database also identifies the trunk carriers for the program signals (identified by VPI/VCI values) at other points in the network. For example, as discussed below, an ATM edge device 226 combines ATM cell streams from under utilized bit streams into a smaller number of more fully utilized bit streams. Continuing the example of FIGS. 5 and 6, the right table in FIG. 6 shows the assigned DS3 number and the VPI/VCI values for the programs on that DS3 as output from the ATM edge device 226. As shown, each bit stream HE output could contain as many as six cell streams, but each HE bit stream is underutilized. The HE01 from the first VIP's encoder includes only four ATM cell streams, and the HE02 bit stream from the second VIP's encoder contains only two cell streams. The ATM edge device 226 combines the cell streams from the two encoders into a single DS3 bit stream identified as DS3 01 in the TIRKS database example of FIG. 6. DS3 01 includes cell streams identified by the VPI/VCI values of 1001/001, 1001/002, 1001/003, 1001/004,1002/001 and 1002/002.

Preferred Network Implementation

Figure 7A:
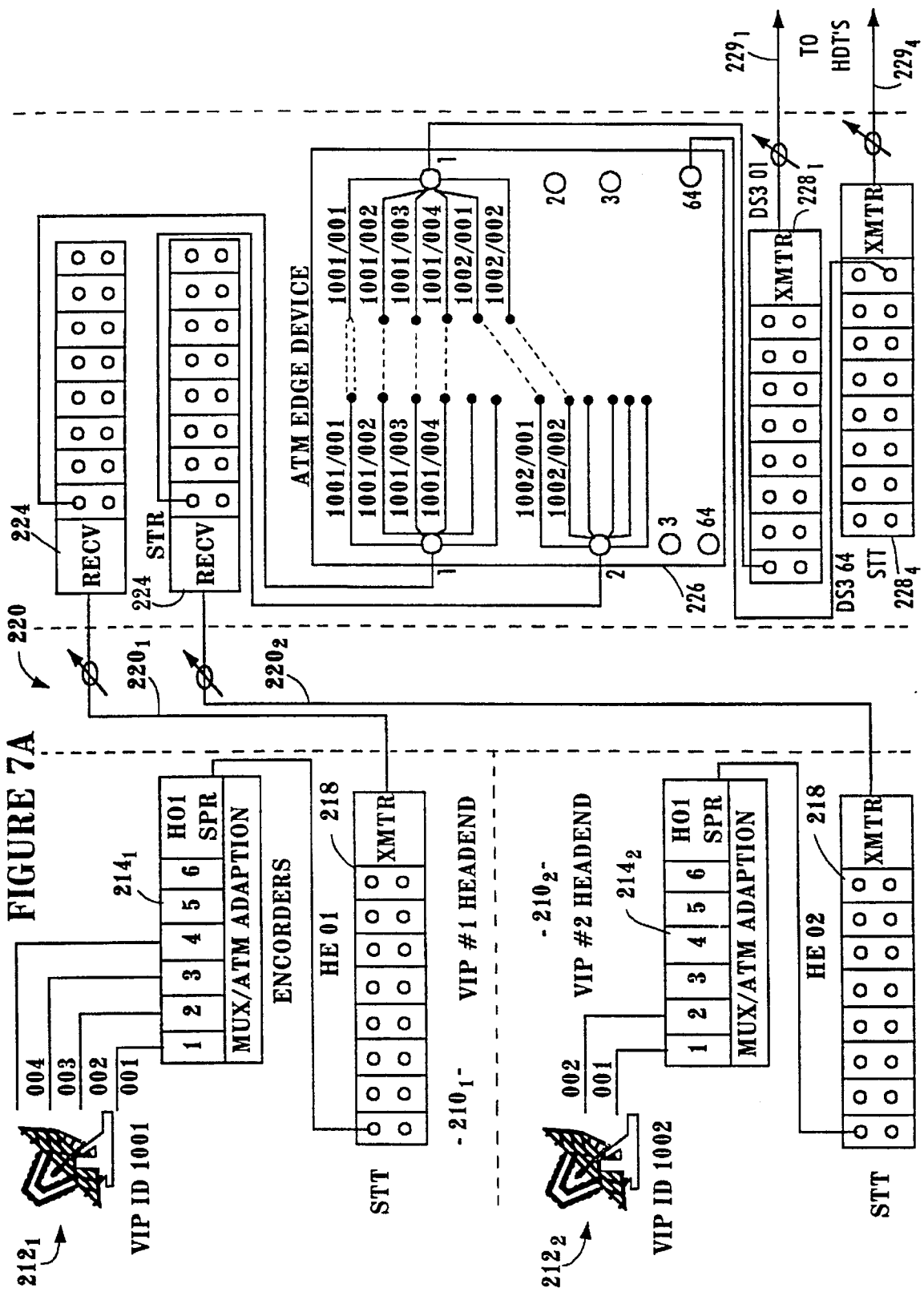
FIGS. 7A and 7B together depict a block diagram of a full service digital broadband network in accord with a preferred embodiment of the present invention.
Figure 7B:
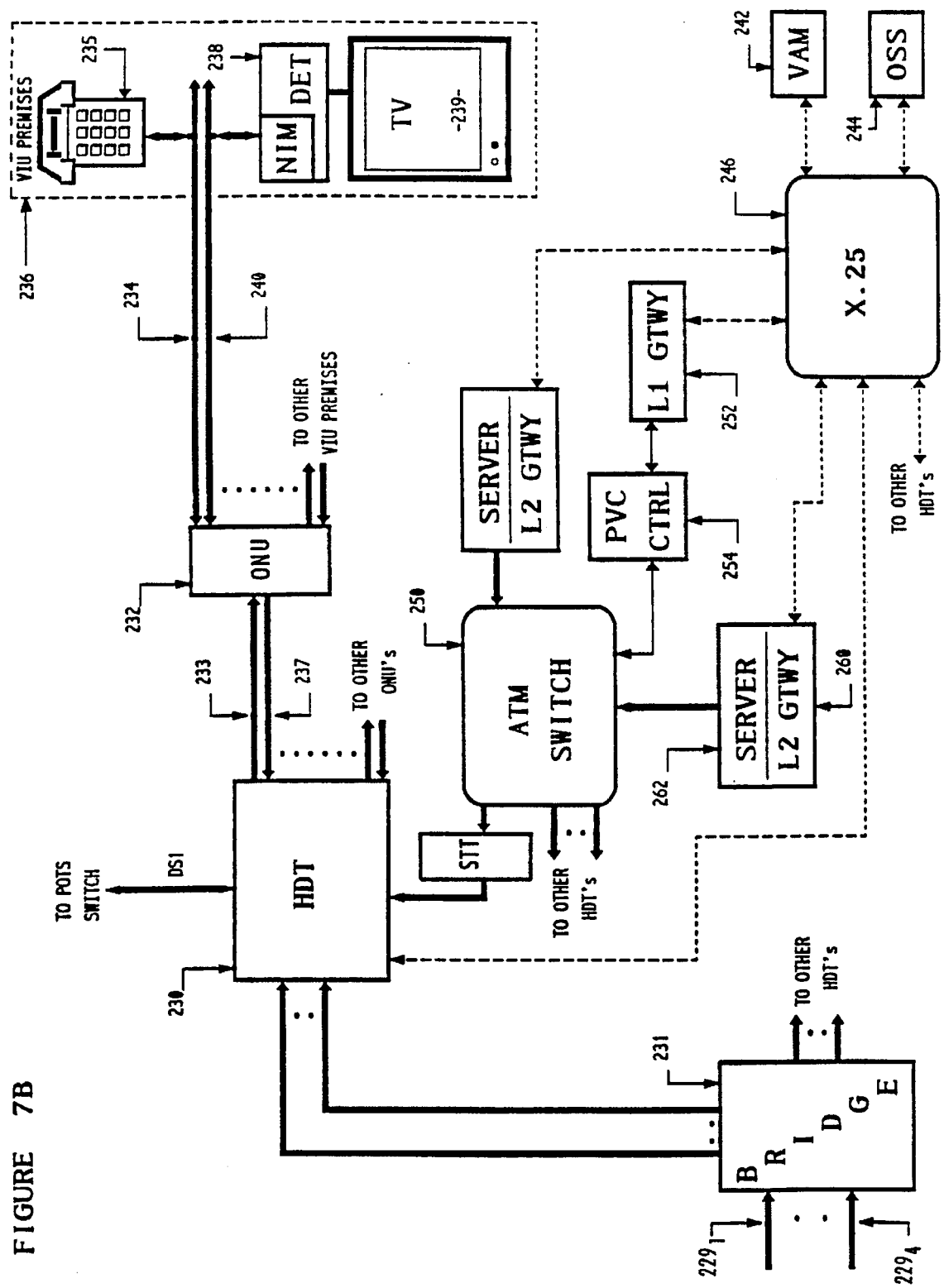

FIGS. 7A and 7B together illustrate a preferred architecture for a full service network utilizing the VPI/VCI management techniques of the present invention. The illustrated network provides transport for broadband services including broadcast video and IMTV type services, such as video on demand. The network also provides interactive text services and voice telephone services.

For broadcast services, the ATM backbone network includes an ATM edge device 226 and optical fibers $220_1$, $220_2$ from the VIP headends to that edge device. The ATM backbone network includes four optical fibers $229_1$ to $229_4$ carrying broadcast programming from the ATM edge device 226 to a large number of host digital terminals (HDT's) 230 (only one of which is shown in FIG. 7B).

The local loop network consists of the HDT's 230, two-way optical fiber pairs between the HDT's 230 and optical network units 232 (ONU's), and coaxial cables 240 and twisted wire pairs 234 connecting the ONU's to the subscriber premises equipment. Control processor elements within the HDT's 230 and a video administration module (VAM) 242 are the elements which control broadcast services.

For interactive multimedia television (IMTV) services, the ATM backbone network includes at least one ATM switch 250. The ATM switch is controlled by a PVC controller 254. A subscriber wishing to initiate an IMTV session interacts with a level 1 gateway 252 which in turn communicates with the PVC controller 254 to obtain the requisite bandwidth through the switch 250.

Signaling communications between the DET's 239 and the serving HDT 230 utilize a consumer electronics (CE) bus protocol. In the presently preferred embodiment, signaling communications between the other nodes of the network ride on an X.25 packet switched data network 246. In future implementations, instead of data network 246, the ATM switch 250 will carry the signaling traffic together with the IMTV broadband traffic.

For simplicity and ease of understanding, it is assumed here that the network is set up to transport broadcast services from two VIP's and that each of those VIP's offer only the programs listed in the exemplary VIP profile database of FIG. 5. As noted above, in practice there will be more than two broadcast VIP's on the network together offering at least 384 channels of broadcast programming. FIG. 7A includes notations regarding the source carrier and the DS3 on the broadcast trunk fiber carrier which correspond to the listings from the TIRKS database example of FIG. 6.

As shown in FIG. 7A, the network receives broadcast video services from the first VIP's broadcast video headend $210_1$ and receives broadcast video services from the second VIP's broadcast video headend $210_2$. Each of the broadcast video headends $210_1$, $210_2$ generates a standard analog signal, for example an NTSC television signal, from any analog source $212_1$, $212_2$, such as a satellite antenna, microwave antenna, TV antenna, VCR, etc. The baseband signals from the source are applied to an encoder 214. Each of the encoders $214_1$, $214_2$ includes a real time MPEG-2 encoder and an ATM multiplexer, which function as discussed above with regard to FIG. 4C.

In the preferred embodiment, each encoder 214 compresses up to six NTSC analog audio/video program signals in parallel into an MPEG-2 format. The resulting six MPEG-2 packet streams with the appropriate overhead information are combined into a single MPEG-2 stream at 45 Mb/s (DS3). The transmission of ATM cells in an asynchronous DS3 signal requires a common clock reference in order to ensure frame alignment between the ATM multiplexer and a super trunk transmitter 218. The ATM mux therefore presents up to six MPEG-2 channels in ATM cell format from the ATM multiplexer 215, in accordance with a physical layer convergence protocol (PLCP). The PLCP is a framing structure used to ensure that ATM cells are aligned with respect to a corresponding video frame, even though there may exist drifting of a start and end of a typical DS3 frame. Specifically, the PLCP references a DS3 header and identifies the location of each ATM cell with respect to the DS3 header. Since the DS3 frame contains a maximum of twelve ATM cells, the PLCP notes the location of each of the twelve cells with respect to the DS3 header. Therefore, even though there may be DS3 frame drifting, the PLCP ensures alignment, from a cell perspective, between the cell layer and the DS3 frame so that each of the twelve ATM cells within each DS3 frame can be located.

In the example illustrated in the drawings, the encoder $214_1$ encodes each of the first VIP's four broadcast programs in MPEG-2 packets and executes the adaptations of FIGS. 4A and 4B to convert those packets into ATM cells. In so doing the ATM mux within the encoder $214_1$ maps MPEG PID values for the programs into appropriate VPI/VCI values for addition to the cells for each program. The cells from the first broadcast program 001 (HBO) have a VPI/VCI value of 1001/001. The cells from the second broadcast program 002 (Showtime) have a VPI/VCI value of 1001/002. The cells from the third broadcast program 003 (Disney) have a VPI/VCI value of 1001/003. The cells from the forth broadcast program 004 (Showtime) have a VPI/VCI value of 1001/004. The ATM mux in the encoder $214_1$ combines the cell streams from the four broadcast source programs into a single bit stream and adds null cells as necessary to produce a combined stream at a DS3 rate. This combined stream is identified as HE01 (see also FIG. 6).

In a similar manner, the encoder $214_2$ encodes each of the second VIP's two broadcast programs in MPEG-2 packets and executes the adaptations of FIGS. 4A and 4B to convert those packets into ATM cells. In so doing the ATM mux within the encoder $214_2$ maps the PID values into appropriate VPI/VCI values for addition to the cells for each program. The cells from the first broadcast program 001 (HBO) have a VPI/VCI value of 10021/001, and the cells from the second broadcast program 002 (Cinemax) have a VPI/VCI value of 1002/002. The ATM mux in the encoder $214_2$ combines the cell streams from the two broadcast source programs into a single bit stream and adds null cells as necessary to produce a combined stream at a DS3 rate. This second combined stream is identified as HE02 (see also FIG. 6).

Although not shown for simplicity, to use the full capacity of the network, each of the two VIP's and/or additional VIP's would have additional encoders 214 to similarly encode a variety of other broadcast programs. The ATM mux in each such additional encoder is programmed to recognize the PID values of packets for each additional program and apply the adaptation techniques discussed above relative to FIGS. 4A and 4B to map the packets for each additional program into cells having the assigned VPI/VCI value for that program. The bit stream output by the ATM multiplexer is identified in the TIRKS database by an HE number and will contain cells identified by one VPI value corresponding to the one broadcast VIP and up to six VCI values identifying the program channels included in the particular bit stream.

All broadcast service type video information providers (VIP's) 210 supply programming to the network in the form of a DS3 type, MPEG-2 encoded ATM streams such as that output by the encoders $214_1$ $214_2$. The DS3 bit stream from each encoder goes to one input of a super trunk transmitter (STT) 218. As discussed below, the STT 218 combines a number of DS3 ATM cell streams into one higher rate bit stream and converts the electrical signals to optical signals for transmission over a trunk fiber, e.g. $220_1$ or $220_2$. One broadcast VIP may have a number of STT's 218, and the network will actually carry optical broadcast streams from multiple broadcast service VIP's.

If the optical transmissions are SONET compliant, the super trunk transmitters 218 and super trunk receivers 224 would operate at an OC rate to transport a standard number of DS3 bit streams. For example, OC-12 equipment will transport 12 DS3 bit streams, OC-18 will transport 18 DS3 bit streams, etc. It would also be possible to use an asynchronous optical protocol.

The preferred embodiment uses super trunk transmitters and receivers manufactured by Broadband Technologies, Inc. of Research Triangle Park, N.C. The preferred super trunk transmitters (STT's) 218 are capable of receiving DS3 bit streams from up to sixteen sources, for example up to sixteen encoders 214. Each super trunk transmitter 218 combines those DS3 rate bit streams into a single higher rate bit stream, converts that electrical stream into an optical signal stream and transmits the optical stream over a fiber, such as $220_1$ or $220_2$. The optical fibers $220_1$, $220_2$ each transport up to 16 DS3 streams, wherein each DS3 includes 6 MPEG-2 encoded program signals, for a maximum capacity on the fiber of 96 channels.

According to the preferred embodiment, the network includes a plurality of parallel trunk fibers 220 from different STT's 218 servicing a variety of VIPs. Each fiber 220 goes to a super trunk receiver. A different set of input broadcast television signals are encoded and multiplexed in a manner similar to that discussed above to produce the combined DS3 bit stream (up to 96 channels) for transport over each respective optical fiber 220. The network preferably will service up to 50 VIPs.

The trunk fibers 220 are routed to super trunk receivers 224, each of which recovers up to sixteen DS3 bit streams from the corresponding optical signal stream. In the simplified example shown in FIGS. 5, 6 and 7A, the super trunk receiver $224_1$ recovers the one DS3 rate stream HE01 from the optical transmission on fiber $220_1$ and supplies that DS3 rate bit stream to a first input node of the ATM edge device 226. Similarly, the super trunk receiver $224_2$ recovers the one DS3 rate stream HE02 from the optical transmission on fiber $220_2$ and supplies that DS3 rate bit stream to a second input node of the ATM edge device 226. Each STR 224 may recover up to sixteen DS3's, and the preferred ATM edge device 226 receives at least sixty-four DS3 inputs from the STR's 224. The ATM edge device 226 performs policing and grooming on the input ATM cell streams.

The ATM edge device 226 monitors incoming DS3 data streams and determines whether ATM cells within the data streams should be passed to the network or blocked. This functionality of the edge device 226 serves to police incoming cells based on their VPI/VCI values. The edge device will pass cells only if the VPI/VCI values in the cells correspond to a value indicated as valid in the data tables programmed into the edge device. If a cell does not have a valid VPI/VCI value for a currently active program channel, the edge device will not pass that cell to an output port.

Also, the ATM edge device 226 performs policing of DS3 ATM cell streams by monitoring the data rate of incoming data streams from VIPs. For example, if one VIP has subscribed by contract to transmit a particular channel at a data stream rate of 6 Mb/s, the ATM edge device 226 will prohibit or drop ATM cells having the assigned VPI/VCI value that are transmitted above the subscribed bit rate; in this case, a 6.5 Mb/s stream would be rejected as an unauthorized rate.

In addition, the ATM edge device 226 provides a grooming function, whereby ATM cells are analyzed, on a cell-by-cell basis, to determine if they should be transmitted on the network. Specifically, each ATM cell having a valid VPI/VCI value is switched through the ATM switch fabric assigned to carry the program identified by the VPI/VCI value. The ATM edge device 226 combines a specified six ATM cell streams into a DS3 bit stream for output on each DS3 output port.

This ATM cell mapping enables DS3 ATM cell streams that are transmitted at less-than-full capacity on the trunk fibers 220 to be mapped onto DS3 streams operating at full capacity. Although each optical fiber 220 has a capacity of transporting up to 16 DS3 ATM streams, the optical fiber 220 typically will not be operated at capacity, when broadcast VIP's do not offer an even multiple of six channels or when VIP's using the optical fibers have varying bandwidth requirements over time. The ATM edge device 226 processes all incoming DS3 bit streams from all of the optical fibers 220, and maps the ATM cell streams from those inputs into at least one and preferably sixty-four condensed, or combined DS3 output bit streams for further transmission through the network. Thus, the ATM edge device is able to fully load the optical fibers serviced by the STT's 228 to fully load the downstream broadcast capacity of the network.

In the illustrated simple example, the ATM edge device 226 utilizes the information shown in FIG. 6 from the TIRKS database to combine the programs from the first and second VIP's into a single DS3 output stream DS3 01. Specifically, the ATM edge device 226 separates out the four ATM cell streams received on input node 1 into four streams identified by VPI/VCI values 1001/001, 1001/002, 1001/003, and 1001/004. The ATM edge device 226 separates out the two ATM cell streams received on input node 2 into two streams identified by VPI/VCI values 1002/001 and 1002/002. The edge device routes all six of these cell streams through an internal ATM switch fabric (not shown in detail) for combination on a single output port 1 for DS3 01. In accord with the present invention, the edge device 226 does not modify the VPI/VCI values. In the output stream on output port 1, six cell streams are present identified by VPI/VCI values 1001/001, 1001/002, 1001/003, 1001/004, 1002/001 and 1002/002.

As shown, the ATM edge device does not perform an actual translation of the VPI/VCI values, as in the prior art ATM systems. In the edge device and other ATM components (e.g. switch 250) in the network, the ATM processing component may route the cells through without actually manipulating the contents of the VPI and VCI fields of the cells. Alternatively, a particular ATM processing component available from a chosen equipment vendor may be constructed so that it must take out a VPI/VCI value of an input cell and replace it with a new VPI/VCI value before output thereof. In such a case, the ATM processing component would be programmed to remap the input values for the VPI/VCI's into identical output values, e.g. VPI/VCI 1001/001 on the input would be replaced with the same 1001/001 values, etc.

The ATM edge device 226 outputs each groomed DS3 stream to a super trunk transmitter (STT) similar in structure and operation to the STT's 218 discussed above. In a preferred embodiment, each DS3 from edge device 226 goes to one input of the four STR's $228_1$ to $228_4$. The preferred embodiment can carry up to 384 broadcast program channels over a capacity of 64 DS3 signal paths (four fibers $229_1$ to $229_4$ each carrying sixteen DS3's in a manner similar to the maximum possible on each fiber 220). In that embodiment, the STT's 228 receive the 64 DS3 ATM streams from the ATM edge device 226, and outputs the ATM streams over four parallel optical fibers SONET or other protocols could be used on the fibers $229_1$ to $229_4$ and/or the network could include additional fibers.

The ATM edge device may comprise a relatively small capacity ATM switch. A more detailed description of the ATM edge device and its operation is disclosed in commonly assigned copending U.S. patent application Ser. No. 08/380,744 filed Jan. 31, 1995 entitled "Full Service Network Using Asynchronous Transfer Mode Multiplexing" (attorney docket no. 680-109), the disclosure of which is incorporated herein in its entirety by reference.

The ATM edge device 226 outputs at least one DS3 stream of combined ATM streams and preferably 16 such streams to each of four super trunk transmitters (STT's) $228_1$ to $228_4$. The ATM edge device 226 will preferably output up to 64 DS3 bit streams to the four STT's $228_1$ to $228_4$. In the illustrated example, DS3 01 output from the ATM edge device 226 goes to the first input port of the first STT $228_1$. Subsequent output ports go to subsequent inputs of the same and succeeding STT's. For example, the output from port 64 of the edge device 226 carries the DS 64 bit stream to the sixteenth input of the forth STT $228_4$. Each particular STT combines the DS3 bit streams into an optical stream in a manner similar to STT 218 for transmission on one of the four fibers $229_1$ to $229_4$.

The signal stream on each optical fiber $229_1$ to $229_4$ is applied to a bridge circuit 231 to supply the optical signal stream through corresponding trunk fibers to a large number of Host Digital Terminals (HDT's) 230 distributed throughout the serving area. The bridge circuitry includes passive bridging elements and may include active bridging elements. The preferred embodiment utilizes HDT's manufactured by Broadband Technologies, Inc. of Research Triangle Park, N.C. Each HDT 230 handles up to 256 subscribers by switching DS3 bit streams carrying selected program channels onto optical fibers to up to 32 optical network units 232 (ONU's). The ONU's 232 transfer the DS3's over respective coaxial cables to subscriber terminals for display on associated television sets.

The downstream optical fibers 233 from the HDT 230 to each connected ONU preferably transport 24 DS3 ATM cell streams, e.g. using OC-24 SONET compliant equipment. Together, the downstream fiber 233 and upstream fiber 237 also provide transport for 2-way telephone communications and 2-way signaling channels. In an alternate embodiment, the network might use a signal fiber between the HDT and each ONU and provide both downstream traffic and upstream traffic on that one fiber.

In the illustrated embodiment, the downstream optical fiber from the HDT 230 to each ONU 232 may use either an asynchronous optical protocol, or the synchronous (SONET) OC rate transport. The ONU's 232 provide appropriate interfacing between the voice channels on the fibers and twisted wire pair 234 for telephone service into the subscriber premises.

Each video information user (VIU) premises 236 is preassigned three DS3 slots on the downstream fiber from the HDT 230 to the ONU 232 for broadband service. Each home or living unit 236 is preferably allocated a capacity of four digital entertainment terminals 238 (DET's), with three being active at any one time. A coaxial drop 240 for each premises 236 carries 180 Mb/s baseband digital data, which will simultaneously transport three 45 Mb/s DS3 bit streams. For a particular VIU premises 236, the three DS3 channels on the fiber from the HDT 230 to the ONU 232 and on the drop cable 240 are individually assignable to different DET's 238 within the subscriber's premises 236. The ONU 232 performs optical to electrical conversion, separates out the DS3's received over the downstream optical fiber 233 from the HDT 230 and supplies the selected DS3 bit stream to appropriate channels on the coaxial cables 240 going to the respective subscriber premises 236.

For narrowband signaling information, the ONU 232 passes all of the downstream signaling data received from the HDT 230 on fiber 233 through to all of the coaxial drop cables 240, so that for signaling data the cables look like a common bus shared by all of the connected DET's. In the downstream direction, signaling packets are interleaved with the ATM cell stream packets. In the upstream direction, the signaling channel on the coaxial cable 240 is in a different frequency portion of the spectrum from the downstream DS3 transmissions. The ONU combines all of the upstream signaling packets from subscriber drop cables 240 into a digital data stream and transmits that data stream together with digitized upstream telephone service signals over the upstream fiber 237 to the HDT 230.

Each DET includes a network interface module (NIM) for connecting to the coaxial drop cable 240 to send control signals to the ONU 232 and receive video and data signals from the ONU 232. The DET 238 includes means to selectively demodulate received data from an assigned one of the three DS3 slots on the coax cable 240, an ATM demux for mapping ATM cells back into the corresponding MPEG packets, and an MPEG-2 decoder. Specifically, the demux captures and processes ATM cells bearing specified VPI/VCI header information corresponding to the selected program channel from the DS3 stream in the manner described above with regard to ATM demux 54. The MPEG-2 decoder in sequence reconstructs the frames for a particular program from packets bearing the appropriate PID value, decompresses the compressed digital video information, and displays the decompressed digital video information in the appropriate format. In the preferred embodiment, the ATM demux is an element of the NIM portion, and the MPEG-2 decoder is an element of the main portion of the DET 238.

The main portion of the DET 238 also includes a CPU, comprising a 386 or 486-type microprocessor and associated memory (RAM, ROM and EPROM). Digital signal processors, controlled by the CPU, decompress the received MPEG video and audio signals. The DET 238 also includes a graphics display generator for generating displays of text data, such as the initial turn-on selection menu for overlay on or replacement of a video program stream. The DET also includes digital to analog converters and appropriate drivers to produce output signals compatible with a conventional television set.

According to the preferred embodiment, the DET 238 is a programmable device with software for broadcast channel selection and decoding residing permanently in the DET memory. Additional software may be downloaded into the DET 238 as applications programs to facilitate certain interactive services. A more detailed description of the structure of the DET and the operations thereof involved in downloading applications software and operating system changes into the DET are disclosed in copending application No. 08/250,791, filed May 27, 1994 (attorney docket No. 680-083), incorporated herein in its entirety by reference.

Each DET 238 includes means to receive selection signals from a user via remote control, and as noted above, the DET 238 responds by transmitting appropriate data signals over a narrowband signaling channel on the coaxial drop cable to the ONU 240. According to the preferred embodiment, the narrowband signaling channel uses X.25 or a consumer electronics (CE) bus protocol. With the CE bus protocol, for example, the active DET's 238 are assigned signaling time slots by the HDT 230, and each active DET 238 transmits channel selection data upstream to the ONU 232 in its assigned slot.

The ONU 232 multiplexes the data signals from the DET's it services together and transmits those signals to the HDT 230 over an upstream channel on an optical fiber. If the data represents selection signals, the HDT responds to that data as outlined above, and stores data identifying each subscriber's selections for subsequent periodic uploading to a Video Administration Module (VAM) 242. The HDT's 230 connect to the VAM through a first X.25 packet data communication network 246.

The operations of each HDT 230 are controlled by data tables stored within the HDT. The video information providers (VIP's) provision various services for their subscribers by establishing appropriate mapping and profile data in the tables in the HDT's 230. The VIP's, however, do not have direct access to the data tables within the HDT's. Instead, the VIP's access the VAM 242 through a personal computer interface 244 and the X.25 data communication network 246. The VIP's 210 provide provisioning data through the OSS 244 to the VAM 242, and the VAM 242 periodically downloads that data to the appropriate HDT's 230.

The provisioning data downloaded to the HDT's 230 includes channel mapping information and subscriber authorization control information. The channel mapping information specifies what programs are carried on each ATM virtual circuit, within each DS3, on each respective optical fiber. The HDT 230 accesses the channel mapping information in response to each program selection by a subscriber to route the correct DS3 to the requesting DET 238 and to inform the DET 238 as to which virtual circuit within that DS3 carries the requested program. The authorization control data indicates which programs each subscriber is authorized to access, e.g. because that party has subscribed to the particular program service and is not delinquent in bill payments. When a subscriber requests a program, the HDT 230 checks this data to determine whether or not to supply the program to the subscriber's DET 238.

In operation, the network administration and support personnel enter the VIP profile information including the VPI/VCI assignments in the TIRKS database and manipulate that database to define necessary routing tables for transport of the VIP's broadcast program channels through the network. The TIRKS database then outputs appropriate information for programming the ATM edge device 226 and information for programming the VAM 242. The VAM 242 periodically updates the actual control tables in each HDT 230 via communications through the X.25 signaling network 246. In particular, the data downloaded to the HDT's 230 indicates the DS3's on each fiber, e.g. DS3 01 to DS3 16 on the first incoming fiber, DS3 17 to DS3 32 on the second incoming fiber, etc. The data downloaded to the HDT's 230 indicates the VPI/VCI values for each program channel within each DS3 in a manner similar to that shown in the right table of the portion of the TIRKS database shown in FIG. 6. In the preferred embodiment, the data in the HDT will also include an initial PID value used in capturing and decoding the MPEG-2 packets for each program channel.

Figure 8:
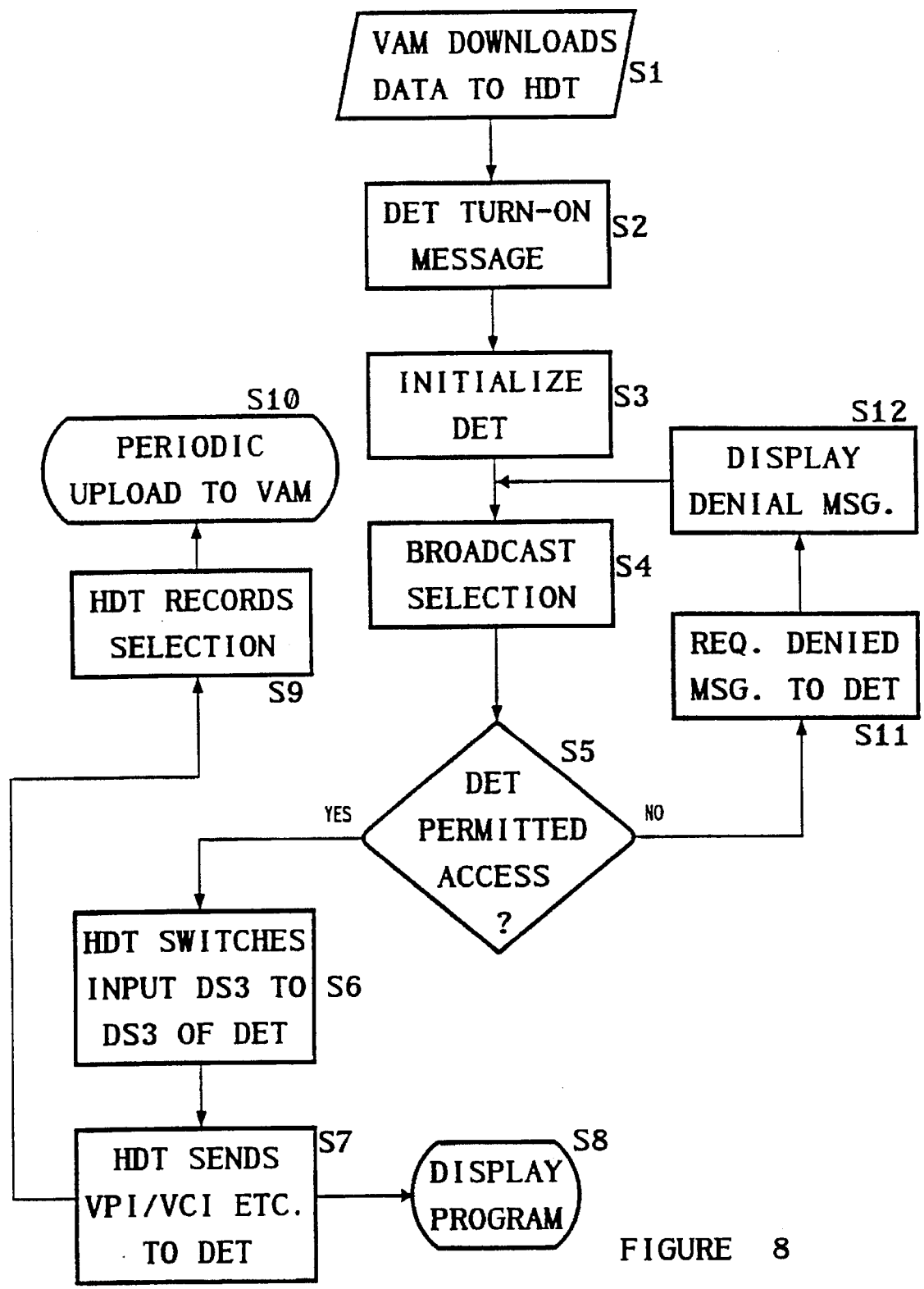
FIG. 8 is a flow chart illustrating the procedures for broadcast channel selection and network management based on the VPI assigned to the VIP and the VCI assigned to the requested program channel.

FIG. 8 provides a simplified flow diagram of the high level processes involved in supplying a broadcast video services to a particular DET 238. At step S1, the VAM 242 periodically downloads the various management data needed to operate the HDT 230, to provide broadcast services. As discussed below, the downloaded data includes the various routing table information from the TIRKS database. The downloaded data also includes a subscriber profile for each subscriber served by the particular HDT. This profile contains data relating to the subscribers' DET's and data relating to services the subscribers are entitled to receive through each DET 238. If the subscriber has PIN number routines, as discussed later, the downloaded data includes the PIN number and related channel information.

In operation, each time a subscriber turns on a DET 238, the DET transmits an appropriate signaling message upstream to the HDT 230 (step S2). The HDT stores a table of valid equipment ID's for the DET's it services. The signaling message transmitted to the HDT 230 at turn-on includes the equipment ID for the particular DET 238. When the HDT 230 receives the initial signaling message from the DET, the HDT executes a routine at step S3 to initialize the DET. As part of this initialization routine, the HDT 230 validates the DET equipment ID and assigns one of the DS3 slots on the downstream fiber 233 to the ONU 232 to that DET 238 for as long as that DET remains on. Also, one of the DS3's on the subscriber's coaxial drop cable 240 from the ONU 232 is assigned to the DET 236 for the duration of communications. At the same time, the HDT 230 will complete a two-way signaling communication link with the DET. At least on the coaxial cable portion, the packets relating to the signaling link are identified by header information identifying the particular link, i.e. a signaling identifier assigned to this communication between the HDT 230 and the particular DET 238. As part of the initialization routine, the HDT 230 sends one or more signaling messages to the DET 238 identifying the signaling channel assignment and the DS3 assignment. Specifically, for the signaling link, the HDT 230 assigns the next idle signaling ID to this call and informs the DET of that signaling ID assignment.

When a subscriber selects a broadcast program (step S4), the subscriber's DET 238 transmits a channel request message, including the equipment ID of that DET and channel selection information, upstream through the signaling link to the HDT 230. Using portions of the downloaded data, the HDT 230 checks to determine if the particular DET is permitted to access the requested channel (step S5). The access decision may relate to whether or not the VIU has subscribed to the program service requested. Alternatively, the HDT 230 may execute a PIN/password routine discussed later to determine if the person currently operating the DET is allowed access to the particular broadcast program service.

If the subscriber is permitted access to the requested channel, processing flows to step S6. At S6, the HDT 230 switches the DS3 bearing the requested channel from one of the trunk fibers onto the DS3 assigned to the requesting DET 238 on the fiber 233 going to the ONU 232 serving the particular subscriber. The ONU 232 in turn switches the assigned DS3 on the fiber 233 onto the DS3 assigned to the particular DET 238 on the drop cable 240 into the VIU's premises 236. At step S7, the HDT 230 addresses a downstream control message to the DET 238 using the assigned signaling call ID. The control message identifies the VPI/VCI of the requested program within the DS3 and the MPEG PID value for the MPEG PROGRAM MAP table, so that the DET 238 can select and begin decoding MPEG-2 encoded transport packets for the selected program to produce standard signals for driving a television set 239 (step S8).

Consider momentarily the simplified example illustrated in the data tables shown in FIGS. 5 and 6, if the channel request message indicates that the user selected the Disney service offered by the first broadcast VIP, the VIP profile information (FIG. 5) indicates that that service has a VPI/VCI value of 1001/003. The information from the right side table of the TIRKS database indicates that the cell stream for that VPI/VCI value is part of DS3 01. As shown in FIG. 7A, that DS3 rides on fiber $229_1$. The HDT 230 therefore utilizes the relevant information downloaded and stored therein to switch the DS3 01 from the input fiber corresponding to fiber $229_1$ onto the DS3 assigned to the requesting DET 238 on the fiber 233 going to the ONU 232 serving the particular subscriber. The ONU 232 in turn switches the assigned DS3 on the fiber 233 onto the DS3 assigned to the particular DET 238 on the drop cable 240 into the VIU's premises 236. The HDT 230 utilizes the relevant information downloaded and stored therein to inform the DET 238 of the VPI/VCI value 1001/003 and an MPEG PID value for the MPEG PROGRAM MAP table of the first VIP's Disney program channel. The DET 238 uses the VPI/VCI value 1001/003 and the received PID value to begin decoding MPEG-2 encoded transport packets for the selected program. The DET 238 outputs signals to cause television set 239 to display the Disney programming broadcast by the first VIP.

For purposes of usage statistics, the HDT 230 will map the equipment ID of the DET into a billing number ID. The HDT 230 records the billing number ID together with the VPI/VCI value of the channel selection and the time of the request (step S9). When the DET subsequently indicates a request for a new channel or turn off, the HDT 230 will calculate the duration of the presentation of the first selected channel and add the duration value to the record of that selection. In this manner, the HDT 230 accumulates viewing statistics identifying channel, start time and duration, relating to each program selection by each individual DET 238. The HDT periodically uploads this usage information through the X.25 signaling network 246 to the VAM 242 (step S10).

At decision step S5, if the data stored in the HDT in some way indicated that access was not permitted, then processing would flow to step S11. In that step, the HDT 230 sends a signaling message to the DET 238 indicating denial of the channel selection request. In response, the DET 238 generates appropriate signals to display a denial message on the associated television set 239. Typically, the viewer will then select another broadcast channel and processing resumes at step S4.

As noted above, the HDT 230 switches DS3's and instructs the DET 238 what VPI/VCI values to use to capture cells for particular programs. The DET 238 processes an assigned one of the three DS3 signals carried on the coaxial cable into the VIU's premises 236, and from that DS3, the DET 238 captures cells having the VPI/VCI value that the HDT instructed it to capture. When a subscriber wants to switch channels, if the newly selected channel is in the DS3 stream already going to the subscriber's DET, the HDT 230 provides the DET with the new VPI/VCI value and PID value for the new channel. The DET 238 can begin immediately capturing and processing cells bearing the new VPI/VCI and decoding payload data from those cells to present the program to the user via the television set. If the selected channel is not in the DS3 currently going to the particular DET 238, the HDT 230 will switch the DS3 for the new channel from the correct incoming optical fiber onto the DS3 assigned to the DET on the fiber 233 to the ONU 232. The ONU 232 supplies that new DS3 to the DET 238 via the currently assigned DS3 slot on the subscriber's coaxial drop cable 234 so that the DET 238 will begin receiving the new DS3. Through the downstream signaling channel, the HDT 230 also informs the DET 236 of the new VPI/VCI to permit the DET to capture and process cells and begin decoding payload data from those cells to present the newly selected program to the user via the television set. Again, the HDT 230 will store VPI/VCI information together with DET identification data, start time and duration, to accumulate usage statistics regarding the channels selected by each viewer for periodic uploading to the VAM 242 through the X.25 signaling network 246.

The VAM 242 also periodically uploads usage statistics accumulated by the HDT's to billing systems (not shown) operated by the relevant broadcast service VIP's through the X.25 data network 246. Although not necessarily co-located with the encoders 214 through which each VIP 210 supplies programming to the network, each VIP typically operates some form of computerized billing and authorization control processor for converting the usage information into billing data and for generating program mapping and authorization data for downloading through the VAM 242 to the HDT's 230.

In the currently preferred implementation, the VAM 242 maintains a channel data table for up to 1500 logical channels. Each HDT 230 receives 384 channels. Each HDT therefore stores the relevant data table information for only those 384 channels that are currently active through the particular HDT. In the VAM table, each channel has a logical channel number 1–1500. For each logical channel, the table in the VAM identifies a source channel, which is the DS3 on the fibers $229_1$ to $229_4$, the VPI/VCI value, and a viewer channel number. The viewer channel number is the number intended for display on the TV screen and for input by a viewer selecting that channel by number input.

Assume now as a more complicated example that there are two VIP's on the system, Futurevision and Bell Atlantic Video Services (BVS). Futurevision has purchased 15 broadcast channels on the network. The network has assigned Futurevision a VPI value of 1123 and has assigned 001 to 015 as VCI values for Futurevision's services. The VAM data table, identifies Futurevision's services as logical channel numbers 875 to 889. The network has also identified the source DS3's carrying the 15 programs to the HDT's 230. Similarly, BVS has purchased 15 broadcast channels on the network. The network has assigned BVS a VPI value of 1145 and has assigned 001 to 015 as VCI values for BVS's services. The VAM data table, identifies BVS's services as logical channel numbers 1001 to 1015. The network has also identified the source DS3's carrying the 15 programs for BVS to the HDT's 230. All of this information is recorded in the VAM 242. The VAM 242 also stores an arbitrary viewer channel number of each of the program services of each VIP. The VAM 242 downloads the relevant information to the HDT's 230.

In this example, a viewer selects Futurevision as the VIP and receives a display of a menu of Futurevision's 15 channels. Futurevision might choose to have those channels numbered 1 to 15 for display and selection by the user. Similarly, if the viewer selects BVS as the VIP, the viewer sees a display of a menu of BVS's 15 channels. BVS might also choose to have the channels numbered 1 to 15 for display and selection by the user. The HDT 230, however, will correlate the VIP selection and channel selection to the DS3, VPI/VCI and PID information for the particular logical channel and supply that channel through the DET for display on the user's television set, in essentially the manner discussed above.

The preferred embodiment of the network disclosed in FIGS. 7A and 7B also provides a PIN/password channel control feature, e.g. to permit parents to restrict their childrens' access to certain channels. For this service, a subscriber would interact with the broadcast service provider (VIP) to identify the restricted broadcast channels and define the PIN numbers or passwords. The VIP $210_1$ or $210_2$ would download the relevant control information to the VAM 242, either through the X.25 network or by communications through the OSS 244. The VAM 242 would download appropriate service profile data for the subscriber into the HDT 230 servicing that subscriber's premises 236 identifying the restricted channels by VPI/VCI values and identifying one or more valid PIN's. Subsequently, when someone at those premises selected one of the restricted channels through one of the DET's 238, before supplying the DS3 to the subscriber premises and supplying the VPI/VCI value to the DET, the HDT 230 would recognize this from the subscriber's profile data and transmit a signaling instruction to the DET 238 to output a prompting type display and/or audio message requesting input of the PIN or password. The DET 238 would subsequently transmit input information to the HDT 230. If that input information matches the PIN or password, the HDT 230 would switch the DS3 carrying the channel through to the DET and supply the VPI/VCI information for the program channel to the DET 238, to permit decoding and display in the above discussed manner.

The present invention may also provide pay per view event services through the broadcast program channels. A VIP 210 may set up such a service through the VAM 242, so that when a user first requests a particular event, the HDT 230 will supply that event to the user's DET 238 for a five minute preview period. During the preview period, the user has the option to buy the pay per view event by operation of appropriate controls on the DET 238. If so operated, the DET 238 transmits a purchase message upstream to the HDT 230. The HDT 230 later uploads the purchase data (including the VPI/VCI value) and a subscriber identification to the VAM 242, and the VAM 242 uploads that data to the relevant VIP for billing purposes, in essentially the same manner as discussed above relative to usage statistics.

The network will track VPI/VCI values for channels broadcast through the network. Using the VPI value for each VIP, the network will accumulate data on the VCI values to determine the number of channels actually broadcast. For the simplified example of FIGS. 5 and 6, a first VIP might actually transmit four channels of broadcast programming. The network would detect the four VCI's used by that VIP and bill the first VIP for transport of the four channels. A second VIP might only transmit two channels of broadcast programming. The network would detect the two VIC's used by that VIP and bill the second VIP for transport of the two channels. The VIP profiles would serve to translate the VPI/VCI values back to information regarding the VIP's particular services so that the VIP could administer and bill for its services to the actual end video information users (VIU's).

The presently preferred embodiment assigns one VCI to each program service a VIP will broadcast. However, it would be possible to assign a VIP two different VCI values for use at exclusively different times. For example, from 6:00 AM to 9:00 PM the VIP might offer a family oriented viewing service using the first VCI value. From 9:00 PM to 6:00 AM the VIP would turn that service off. Instead, at the later times the VIP would use second VCI value to transmit more adult oriented programming. The VIP would purchase one channel and pay extra only for assignment of a second VCI. The use of the two VPI/VCI values would be mutually exclusive, the VIP could not use both VCI values simultaneously. The network could carry the ATM cells for the two different types of programs at different times using the two VCI values and would utilize the two different VCI values to administer the different programs. For example, the VAM 242 and the HDT 230 would apply different access control parameters to the streams bearing the two VCI values. Selection of the first program would result in viewing thereof by any person at a home having a subscription to this VIP's broadcast services. However, before allowing the DET 238 to decode cells bearing the second VCI, the HDT might require entry of a valid PIN.

The VAM 242 can program the HDT 230 to offer different levels of access at different times, even if the VPI/VCI value does not change, as in the earlier scenario. The change from ubiquitous access to PIN based access would be strictly a timing function, not a function of a change in the VPI/VCI values. Within the VAM 242 and HDT 230, however, the control data associated with the one VPI/VCI value would specify the time based levels of access.

A VIP may also subscribe to a variable bandwidth channel through the network, e.g. 1.5 Mb/s during one period and 6 Mb/s during another period. The ATM edge device 226 would police this and pass only cells having the VPI/VCI value at or below the correct rate at any given time. The network would also utilize the VPI/VCI value to bill for the variable usage.

The presently preferred network embodiment also provides transport for interactive broadband services such as video-on-demand, typically offered by two or more IMTV VIP's. As shown in FIG. 7B, an ATM switch 250 provides a bit stream carrying one or more DS3's containing ATM cell streams to each HDT 230, to provide point-to-point connections for such services. As discussed in more detail below, the access through this switch 250 is controlled by the Level 1 Gateway (L1 GTWY) 252.

Each non-broadcast or IMTV service provider preferably has a Level 2 Gateway (L2 GTWY) 260 and some form of file server 262. Typically, the VIP will store volumes of MPEG-2 encoded material in a variety of memory devices which form the server. An IMTV VIP's equipment preferably outputs ATM cell streams, encoded in the manner discussed above with regard to FIGS. 4A to 4C, to the ATM switch 250 for transmission through the network. Alternatively, if the provider's equipment transmits only MPEG-2 bit stream data, the network operator would supply an interworking unit similar to the ATM multiplexer 53 discussed above to convert the service provider's bit stream data into a DS3 containing one or more ATM cell streams compatible with the Full Service Network. The ATM switch 250 transmits selected ATM cells on the one or more DS3 streams through an STT and an optical fiber going to the HDT 230 serving a particular VIU who requested a session with the particular IMTV VIP. As part of its routing operations, the ATM switch 250 performs policing and grooming functions of the type performed by the ATM edge device 236.

To establish a broadband communication session or connection through the network between an interactive information service provider 210' and a particular DET 238 requires establishment of a virtual circuit through the ATM switch 250 and the appropriate HDT 230. In the network of FIGS. 7A and 7B, a PVC controller 254 stores data tables defining all possible virtual circuits through the ATM switch 250 to the HDT's 230. These data tables define the header information and the particular fiber output port used to route cells to the correct HDT 230. The data tables thus define "permanent virtual circuits"(PVC's) between the providers and the DET's. Each IMTV VIP is assigned as VPI value, exactly as was done for the broadcast VIP's. Each IMTV VIP also purchases a maximum number of 6 Mb/s sessions which that VIP can utilize. For each possible session, the network assigns a VCI value. The PVC controller includes current VPI/VCI data available to each VIP and an ongoing record of which VPI/VCI values are in use. Thus, at any given time the PVC controller 254 knows what VIP/VCI values are available to each VIP and can be assigned dynamically to provide requested bandwidth for each new IMTV session.

When a subscriber initiates a session with a broadband interactive service provider, for example VIP 210', the subscriber's DET 238 provides an appropriate "off-hook" signal to the HDT 230. The HDT 230 sends the message through the X.25 packet switched network 246 to the Level 1 Gateway (L1 GTWY) 252. When the Level 1 Gateway 252 receives the addressed message from the HDT 230, that Gateway uses the billing number ID of the DET included in the message to check its internal database to determine if the caller is a valid network customer. If the caller is not a valid customer, the system tears downs the session. If the caller is a valid customer, the Level 1 Gateway 252 transmits a call accept message back to the terminal and waits for the first application level message. Once the call is accepted, an X.25 signalling link is provided between the HDT 230 and the Level 1 Gateway 252 for purposes of carrying signaling information between the DET 238 and that Gateway, and the HDT 230 internally associates that signaling call with the signaling call over the fibers 233, 237 and the coaxial cable 240, i.e. the signaling link set up from the HDT 230 through the ONU 23 to the DET 238 when the user turned on the DET.

The DET 238 next sends an initiation or 'hello' message to the Level 1 Gateway 252 that includes basic information including the set-top ID and a set-top type designation. The Level 1 Gateway 252 interacts with the subscriber through the DET 238 to obtain a selection identifying one of the IMTV services providers.

The Level 1 Gateway 252 may execute a PIN number access routine, if the subscriber has previously requested such access control for selected ones of the VIP's. For simplicity here, it is assumed that the currently selected VIP is not subject to such a PIN number requirement. The Level 1 Gateway 252 is merely expecting to receive the VIP selection input from the DET 238, e.g. in response to a menu display, within a predetermined period following the menu transmission. If the Level 1 Gateway 252 receives the selection input message from the DET 238 within the predetermined period, the Level 1 Gateway 252 translates that message into the 4 digit code for the selected VIP's Level 2 Gateway 260.

Once the selection of the VIP is complete, the Level 1 Gateway 252 then goes over the X.25 network 246 to communicate with the selected VIP's Level 2 Gateway 260 and indicates that it has a customer calling. The Level 1 Gateway 252 identifies the customer to the Level 2 Gateway 260 by sending the 10-digit billing number for the calling DET 238. The Level 1 Gateway 252 also transmits set-top identification information and set-top type information for the DET 238 to the Level 2 Gateway 260. The VIP's Level 2 Gateway 260 may accept or reject the call after receiving the initial request indicating availability of the identified customer. If accepted, the Level 2 Gateway 260 sends a message back to the Level 1 Gateway 252 indicating acceptance of the call and provides the Level 1 Gateway 252 with a server output port identification for the port on the server 262 which will service the broadband call. The Level 2 Gateway 262 may also indicate the one of the VPI/VCI values assigned to this VIP allocated to this particular session.

In response, the Level 1 Gateway 252 transmits the X.121 address of the HDT serving the calling customer's DET 238 to the Level 2 Gateway 262. The Level 2 Gateway 262 uses that address to initiate a new signaling communication through the X.25 network to the HDT 230 and identifies the DET 238 to the HDT 230, e.g. by sending the billing ID of the DET to the HDT. The signaling call to the level 1 gateway 252 is taken down when Level 2 Gateway initiates its signaling call, after which the HDT 230 associates the new X.25 signaling call from the Level 2 Gateway 262 with the established signaling call between the HDT 230 and the calling subscriber's DET 238 and performs any necessary protocol conversion. For example, the HDT places downstream signaling data from the X.25 call in packets identified with the signaling call ID assigned to the subscriber's DET 238 at turn-on and transmits those packets through the downstream fiber 233 to the ONU 232 and the coaxial cable 240 to the subscriber's premises 236.

The Level 1 Gateway 252 interacts with the PVC controller 250 to obtain the bandwidth through the ATM switch 250. The Level 1 Gateway 252 advises the PVC controller 254 of the server port identification. The Level 1 Gateway 252 may advise the PVC controller 254 of the VPI/VCI value if such was assigned to the session by the Level 2 Gateway 262. Alternatively, the Level 1 Gateway 252 may obtain a VPI/VCI for the call from internal data or from the PVC controller 254, and then the Level 1 Gateway 252 supplies the assigned VPI/VCI to the Level 2 Gateway 262. The Level 1 Gateway 252 also informs the HDT 230 of a DS3 and VPI/VCI value on the fiber from the ATM switch 250 to the HDT 230 which is assigned to this broadband interactive call. The HDT 230 switches the identified DS3 from the fiber from the ATM switch 250 to the DS3 assigned to the subscriber's DET on the fiber 233. The HDT 230 also transmits a signaling message to the DET 238 indicating the correct VCI/VPI for the cells carrying the downstream broadband transmissions. The HDT 230 may also provide the DET with an initial PID value for use in decoding MPEG packets for the session. The DET will process the ATM cells and decode MPEG data carried in those cells in a manner similar to the processing of broadcast service cells, discussed above.

During the communication session between the subscriber and the IMTV VIP, the DET 238 can transmit control signalling upstream through the ONU 232, the HDT 230 and the X.25 data network to the level 2 gateway 260. The level 2 gateway 260 can also send signaling information, such as control data and text/graphics, downstream through the same path to the DET 238 or preferably as user data inserted in the MPEG-2 broadband data stream. For downstream transmission, the server 262 and/or an associated interworking unit (not shown) will provide ATM cells with an appropriate header, in a manner similar to the encoder equipment 214 shown in FIG. 4C. The VPI value will identify the VIP, and the VCI value will relate to the current IMTV session. The ATM switch 250 will route the cells using the header and transmit those cells to the HDT 230 serving the requesting subscriber 236. The HDT 230 will recognize the header as currently assigned to the particular DET 238 and will forward those cells through the downstream fiber and the ONU 232 to that DET 238, in essentially the same manner as for broadcast programming.

When the Level 1 Gateway 252 set up the IMTV session, that gateway recorded one or more of the DET ID's, the VPI/VCI value and the start time of the session. When an interactive broadband session ends, e.g. as indicated by an exchange of appropriate messages between the DET 238 and the Level 2 Gateway 260, the Level 2 Gateway 260 instructs the Level 1 Gateway 252 to tear down the broadband connection. The instruction includes the customer's billing ID, and the server port identification for the VIP port and the VPI/VCI used for the broadband communication. In response, the Level 1 Gateway 252 stops the billing timing for that broadband session and transmits an instruction to the PVC controller 254 and the serving HDT 230 to tear down the broadband connection between the server port and the customer's DET. The Level 1 Gateway 252 creates a log record of the interactive broadband call for purposes of billing the VIP 210' for the broadband connect time.

The Full Service Network illustrated in FIG. 7A and 7B will also provide narrowband transport for voice and narrowband data services. A digital switch or an analog switch (not shown) will provide standard type plain old telephone service (POTS) for customers of the Full Service Network. The digital POTS switch provides a DS1 type digital input/output port through interfaces conforming to either TR008 or TR303. The DS1 goes to the HDT 230. The DS1 may go through a digital cross-connect switch (DCS) for routing to the various HDT's or directly to a multiplexer (not shown) serving a particular HDT 230. The multiplexer may also receive telephone signals in DS1 format from an analog switch through a central office terminal. The central office terminal converts analog signals to digital and digital signals to analog as necessary to allow communication between the analog switch and the rest of the network.

Although not shown, the telephone service multiplexer for an HDT 230 may multiplex a number of DS1 signals for transmission over one fiber of an optical fiber pair to the HDT 230 and to demultiplex signals received over the other fiber of the fiber pair. The fiber pairs between the HDT 230 and the ONU's 232 will also have a number of DS1 channels to carry telephone and narrowband data signals to and from the subscriber's premises. In addition to the video services discussed above, the ONU 232 will provide telephone signals and appropriate power to the subscribers' premises over the twisted wire pairs 234 connected to subscribers' telephone sets 235.

As noted above, the network will track VPI/VCI values of signals transmitted by the VIP's for billing the VIP's. The system will also track viewer selections by recording the VPI/VCI values of the programs each viewer selects. The HDT will upload the DET identification along with VPI/VCI and time information to the VAM for processing. The VAM correlates the VPI/VCI value to the VIP and the VIP's source program and supplies that information together with the time information to the VIP.

The network will also rely on VPI/VCI values, at least in part, for network maintenance. If there is a problem with a particular program, the problem is correlated with the VPI/VCI value for that program. The cell stream for that program can then be analyzed on various links through the network to isolate and correct the problem. If the problem grows to a level sufficient to trigger an adjustment in billing, e.g. a rebate to the VIP for a protracted network failure, then the VPI/VCI information and time and trouble information are supplied to the billing system (not shown) to make the adjustment.

Transport through the network, usage, and data rates for IMTV services would be administered using VPI/VCI in a similar manner. The ATM switch would perform any necessary policing and routing functions, similar to the functions of the ATM edge device. The PVC controller would accumulate usage statistics based on VPI/VCI values and pass those on for billing purposes. The VPI value is uniquely assigned to the IMTV service provider (VIP) and the network transports the cells through the network without translating the VPI value, so that at all points of the network the VPI value identifies the VIP. The VCI values also are not translated as cells pass through the network, but for IMTV purposes, the network will assign VCI values to a session with a particular DET on a dynamic basis.

In future, when signaling between the DET and the Level 1 and Level 2 Gateways migrates to the ATM switching network, the signaling channels would be administered using similar VPI/VCI rules. Long discussion of how this might be done, but no clear resolution.

In the preferred embodiment discussed above, the HDT 230 switches DS3 bit streams to a plurality of subscriber units in accordance with respective subscriber selection signals. A downtown DS3 data path is established between the HDT and the DET via the ONU. One having ordinary skill in the art will realize that different switching systems and loop technologies may be used. For example, the loop from the HDT or the ONU to the subscriber premises may be replaced by an ADSL arrangement as shown in U.S. Pat. No. 5,247,347 to Litteral et al., incorporated herein by reference. Specifically, customer local loops equipped with Asymmetric Digital Subscriber Line (ADSL) devices are connected to switching elements within the HDT or ONU. In such an arrangement, the video-on-demand system provides for the simultaneous transport of a one-way 1.544 Mb/s signal over the same twisted pair transmitting voice messages to the residential subscriber. The ADSL transported signal is demultiplexed and the 1.544 portion is then decoded using MPEG standard techniques to deliver a full motion video signal. The switching equipment in the HDT and/or the ONU would be modified to switch one 1.544 Mb/s ATM stream from a DS3 on one of the broadcast fibers onto the ADSL line going to the subscriber's premises. ADSL technology may also operate at higher bit rates, e.g. 6 Mb/s. A more detailed description of implementing ADSL technology (1.5 Mb/s or 6 Mb/s) to transmit digital broadband signals from a network to a digital entertainment terminal is found in FIGS. 10 to 12 of commonly-assigned, copending application No. 08/250,792, filed May 27, 1994 (attorney docket No. 680-080). The two ATM networks disclosed in the above incorporated U.S. patent application Ser. No. 08/304,174 also utilize different local loop network technologies. One network disclosed therein utilizes an HDT which switches ATM cell streams to the DET's, rather than switching DS3's, and utilizes a corresponding ATM channelization from the HDT's to the DET's. The other local loop network is a hybrid-fibercoax network transporting four or more MPEG-2 packets streams in each assigned 6 Mhz RF channel. The VPI/VCI management techniques apply to these and other networks utilizing ATM transport and/or switching.

While this invention has been described in connection with what is presently considered to be the preferred embodiment, it is to be understood that the invention is not limited to the disclosed embodiment, but, on the contrary, is intended to cover various modifications and equivalent arrangements included within the spirit and scope of the appended claims.

We claim:

1. A communication system comprising:
   information sources operated by a plurality of service providers;

a plurality of subscriber terminals; and a communication network selectively supplying signals from one of the information sources to one of the subscriber terminals, the communication network comprising:
- (a) at least one asynchronous transport mode (ATM) processing element for transporting the signals from the one information source through a portion of the communication network in a sequence of ATM cells, each ATM cell in the sequence comprising a payload section containing a portion of the signals from the one information source and a cell header comprising a virtual path identifier (VPI) and a virtual circuit identifier (VCI) which the at least one ATM processing element uses to process the ATM cells in the sequence; and
- (b) a network control element administering the operation of the communication network, wherein:
  - (1) the VPI identifies the service provider operating the one information source,
  - (2) the VPI is constant so that ATM cells in the sequence pass through the at least one ATM processing element with said VPI in each cell and are output by the at least one ATM processing element with said VPI in each cell, and
  - (3) the network control element administers at least one function of the communication network based on said VPI.

2. A communication system as in claim 1, further comprising means for gathering usage statistics based on said VPI.

3. A communication system as in claim 1, wherein:

the VCI identifies a program service broadcast through the communication network by the provider operating the one information source, the VCI is constant so that the ATM cells in the sequence pass through the at least one ATM processing element with said VCI in each cell and are output by the at least one ATM processing element with said VCI in each cell, and the network control element administers broadcast of the sequence of cells through the communication network based on said VCI.

4. A communication system as in claim 3, further comprising means for gathering usage statistics based on said VPI and said VCI.

5. A communication system as in claim 4, wherein said means for gathering usage statistics use the VPI and VCI to gather statistics regarding broadcast transmissions by the service provider operating the one information source.

6. A communication system as in claim 4, wherein said means for gathering usage statistics use the VPI and VCI to gather statistics regarding reception by the one subscriber terminal.

7. A communication system as in claim 1, wherein:

the VCI identifies point-to-point interactive session through the network between the one information source and the one subscriber terminal, the ATM cells in the sequence pass through the at least one ATM processing element with said VCI in each cell and are output by the at least one ATM processing element with said VCI in each cell, and the network control element administers transport of the sequence of cells through the communication network based on said VCI.

8. A communication system as in claim 7, further comprising means for gathering usage statistics based on said VPI and said VCI.

9. A communication system as in claim 1, wherein the at least one ATM processing element serves as part of a backbone network, and the communication network further comprises a local loop network for transporting the signals from the one information source from an output of the at least one ATM processing element to the one subscriber terminal.

10. A communication system as in claim 9, wherein:

the at least one ATM processing element comprises a broadcast system which broadcasts the sequence of ATM cells to a plurality of nodes of the local loop network, and the local loop network comprises means for supplying selected cells from the broadcast sequence of ATM cells to the one subscriber terminal.

11. A communication system as in claim 10, wherein:

the means for supplying routes the ATM cell sequence to the subscriber terminal, and the ATM cells in the sequence pass through the means for supplying with said VPI and said VCI in each cell and are output to the one terminal with said VPI and VCI in each cell.

12. A communication system as in claim 11, wherein the broadcast system comprises:

at least two optical fibers carrying ATM cell sequences from the information sources;

an ATM edge device receiving the ATM cell sequences from the at least two optical fibers and supplying the ATM cell sequences to one output; and a broadcast optical fiber network transporting the ATM cell sequences from the one output of the ATM edge device to the plurality of nodes of the local loop network.

13. A communication system as in claim 12, wherein the one information source comprises:

an encoder encoding broadband information into digitized data and encapsulating the digitized data in packets; and an ATM multiplexer mapping the packets into ATM cells and adding said VPI and VCI in a header of each cell to form the sequence of ATM cells.

14. A communication system as in claim 9, wherein:

the at least one ATM processing element comprises an ATM switch providing a point to point connection between the one information source and a node of the local loop network which services the one terminal; and the node of the local loop network which services the one terminal comprises means for supplying information from the sequence of ATM cells from the point to point connection through the ATM switch to the one subscriber terminal.

15. A communication system as in claim 14, wherein:

the means for supplying information routes the ATM cell sequence to the subscriber terminal, and the ATM cells in the sequence pass through the means for supplying information with said VPI and said VCI in each cell and are output to the one terminal with said VPI and VCI in each cell.

16. A communication system as in claim 15, wherein the one information source comprises:

a server outputting broadband information encoded as digitized data encapsulated in packets; and an ATM multiplexer mapping the packets into ATM cells and adding said VPI and VCI in a header of each cell to form the sequence of ATM cells.

17. A communication system as in claim 1, wherein the one information source comprises:

a source of broadband information encoded as digitized data encapsulated in packets; and an ATM multiplexer mapping the packets into ATM cells and adding said VPI and VCI in a header of each cell to form the sequence of ATM cells.

18. In a communication system comprising information sources operated by a plurality of service providers, a plurality of subscriber terminals, and a communication network, a method comprising:

supplying a stream of asynchronous transport mode (ATM) cells containing information from one of the information sources to at least one ATM processing element within the communication network, each ATM cell in the stream comprising a payload section containing information from the one information source and a cell header comprising a virtual path identifier (VPI) assigned to the service provider operating the one information source and a virtual circuit identifier (VCI);

routing the ATM cells in the stream through the at least one ATM processing element based on the VPI or the VCI in each cell and keeping at least the VPI constant so that the at least one ATM processing element outputs each cell in the stream with said VPI in the header thereof;

supplying the information from the one information source from payload sections of cells in the stream output by the at least one ATM processing element to one of the subscriber terminals; and administering at least one function of the communication network based on said VPI.

19. In a communication system comprising information sources operated by a plurality of service providers, a plurality of subscriber terminals, and a communication network, a method comprising:

supplying a stream of asynchronous transport mode (ATM) cells containing information from one of the information sources to at least one ATM processing element within the communication network, each ATM cell in the stream comprising a payload section containing information from the one information source and a cell header comprising a virtual path identifier (VPI) assigned to the service provider operating the one information source and a virtual circuit identifier (VCI);

routing the ATM cells in the stream through the at least one ATM processing element based on the VPI or the VCI in each cell and keeping at least the VPI constant so that the at least one ATM processing element outputs each cell in the stream with said VPI in the header thereof;

supplying the information from the one information source from payload sections of cells in the stream output by the at least one ATM processing element to one of the subscriber terminals; and administering at least one function of the communication network based on said VPI, wherein the step of administering comprises compiling network usage statistics.

20. A method as in claim 19, wherein the step of compiling network usage statistics comprises recording VPI and VCI values of cells carrying information from the one source to accumulate transmission data relating to the service provider operating the one source.

21. A method as in claim 19, wherein the step of compiling usage statistics comprises recording VPI and VCI values of cells carrying information supplied to the one subscriber terminal.

22. A method as in claim 21, wherein the VCI identifies one of a plurality of broadcast program services offered by the service provider operating the one source, and the recorded VPI and VCI values indicate one or more broadcast program service selections by a user of the subscriber terminal.

23. In a communication system comprising information sources operated by a plurality of service providers, a plurality of subscriber terminals, and a communication network, a method comprising:

supplying a stream of asynchronous transport mode (ATM) cells containing information from one of the information sources to at least one ATM processing element within the communication network, each ATM cell in the stream comprising a payload section containing information from the one information source and a cell header comprising a virtual path identifier (VPI) assigned to the service provider operating the one information source and a virtual circuit identifier (VCI);

routing the ATM cells in the stream through the at least one ATM processing element based on the VPI or the VCI in each cell and keeping at least the VPI constant so that the at least one ATM processing element outputs each cell in the stream with said VPI in the header thereof;

supplying the information from the one information source from payload sections of cells in the stream output by the at least one ATM processing element to one of the subscriber terminals; and administering at least one function of the communication network based on said VPI, wherein the step of administering comprises executing at least one maintenance function relating to the communication network based on the VPI.

24. In a communication system comprising information sources operated by a plurality of service providers, a plurality of subscriber terminals, and a communication network, a method comprising:

supplying a stream of asynchronous transport mode (ATM) cells containing information from one of the information sources to at least one ATM processing element within the communication network, each ATM cell in the stream comprising a payload section containing information from the one information source and a cell header comprising a virtual path identifier (VPI) assigned to the service provider operating the one information source and a virtual circuit identifier (VCI) which identifies a program service broadcast through the communication network by the provider operating the one information source;

routing the ATM cells in the stream through the at least one ATM processing element based on the VPI or the VCI in each cell and keeping the VPI and the VCI constant so that the at least one ATM processing element outputs each cell in the stream with said VPI and said VCI in the header thereof;

supplying the information from the one information source from payload sections of cells in the stream output by the at least one ATM processing element to one of the subscriber terminals; and administering at least one function of the communication network based on said VPI and said VCI.

25. A method as in claim 24, wherein the supplying step comprises:
encoding broadband information into digitized data;
encapsulating the digitized data in packets;
mapping the packets into payload sections of ATM cells and adding said VPI and VCI in a header of each cell to form the stream of ATM cells; and
transmitting the ATM cell stream to the at least one ATM processing element.

26. A method as in claim 25, wherein the broadband information comprises analog video information and associated audio information.

27. In a communication system comprising information sources operated by a plurality of service providers, a plurality of subscriber terminals, and a communication network, a method comprising:
supplying a stream of asynchronous transport mode (ATM) cells containing information from one of the information sources to at least one ATM processing element within the communication network, each ATM cell in the stream comprising a payload section containing information from the one information source and a cell header comprising a virtual path identifier (VPI) assigned to the service provider operating the one information source and a virtual circuit identifier (VCI);
routing the ATM cells in the stream through the at least one ATM processing element based on the VPI or the VCI in each cell and keeping at least the VPI constant so that the at least one ATM processing element outputs each cell in the stream with said VPI in the header thereof;
supplying the information from the one information source from payload sections of cells in the stream output by the at least one ATM processing element to one of the subscriber terminals; and
administering at least one function of the communication network based on said VPI, wherein:
together, the supplying steps establish a point to point type communication session between the one information source and the one subscriber terminal;
the VCI identifies the communication session;
the step of routing the ATM cells in the stream through the at least one ATM processing element comprises keeping the VCI constant so that the at least one ATM processing element outputs each cell in the stream with said VCI in the header thereof; and
the administering step comprises administering the at least one function of the communication network based also on said VCI.

28. A method as in claim 27, wherein the supplying step comprises:
encoding broadband information into digitized data;
encapsulating the digitized data in packets;
mapping the packets into payload sections of ATM cells and adding said VPI and VCI in a header of each cell to form the stream of ATM cells; and
transmitting the ATM cell stream to the at least one ATM processing element.

29. A method as in claim 28, wherein the broadband information comprises analog video information and associated audio information.

30. In a communication system comprising information sources operated by a plurality of service providers, a plurality of subscriber terminals, and a communication network, a method comprising:
supplying a stream of asynchronous transport mode (ATM) cells containing information from one of the information sources to at least one ATM processing element within the communication network, each ATM cell in the stream comprising a payload section containing information from the one information source and a cell header comprising a virtual path identifier (VPI) assigned to the service provider operating the one information source and a virtual circuit identifier (VCI), wherein the supplying step comprises:
(a) encoding broadband information into digitized data,
(b) encapsulating the digitized data in packets,
(c) mapping the packets into payload sections of ATM cells and adding said VPI and said VCI in a header of each cell to form the stream of ATM cells, and
(d) transmitting the ATM cell stream to the at least one ATM processing element;
routing the ATM cells in the stream through the at least one ATM processing element based on the VPI or the VCI in each cell and keeping at least the VPI constant so that the at least one ATM processing element outputs each cell in the stream with said VPI in the header thereof;
supplying the information from the one information source from payload sections of cells in the stream output by the at least one ATM processing element to one of the subscriber terminals; and
administering at least one function of the communication network based on said VPI.

31. A method as in claim 30, wherein the broadband information comprises analog video information and associated audio information.

32. In a communication system comprising information sources operated by a plurality of service providers, a plurality of subscriber terminals, and a communication network, a method of administering broadcast services comprising:
assigning a virtual path identifier (VPI) to each service provider;
assigning a virtual circuit identifier to each broadcast program each service provider will broadcast through the communication network;
for each program to be broadcast by each service provider, supplying a stream of asynchronous transport mode (ATM) cells containing information relating to the broadcast program from an information source operated by the service provider to at least one ATM processing element within the communication network, each ATM cell in the stream comprising a payload section containing broadcast program information and a cell header comprising the VPI assigned to the service provider operating the information source and the VCI assigned to the broadcast program;
for each program to be broadcast by each service provider, routing ATM cells in the stream through the at least one ATM processing element based on the VPI or the VCI in each cell and keeping the VPI and the VCI constant so that the at least one ATM processing element outputs each cell in the stream with said VPI and VCI in the header thereof;
receiving a selection of one of the broadcast programs offered by one of the service providers from one subscriber terminal;

supplying information from a cell stream having cell headers containing the VPI assigned to the one service provider and the VCI assigned to the one broadcast program from payload sections of cells output by the at least one ATM processing element to one of the subscriber terminals.

33. A method as in claim 32, further comprising the step of administering at least one function of the communication network based on VPI.

34. A method as in claim 32, further comprising the step of administering at least one function of the communication network based on VCI.

35. A method as in claim 32, further comprising the step of administering at least one function of the communication network based on VPI and VCI.

36. A method as in claim 35, wherein the step of administering comprises compiling network usage statistics.

37. A method as in claim 36, wherein the step of compiling usage statistics comprises recording VPI and VCI values of cells carrying information from each information source to accumulate transmission data relating to the service provider operating each source.

38. A method as in claim 36, wherein the step of compiling usage statistics comprises recording VPI and VCI values of cells carrying information supplied to each subscriber terminal to accumulate data relating to program selections from each subscriber terminal.

39. A method as in claim 35, wherein the step of administering comprises executing at least one maintenance function relating to the communication network.

40. A method as in claim 32, wherein for each program to be broadcast by each service provider the supplying step comprises:

encoding broadband information into digitized data;

encapsulating the digitized data in packets;

mapping the packets into payload sections of ATM cells and adding said VPI and VCI in a header of each cell to form the stream of ATM cells; and transmitting the ATM cell stream to the at least one ATM processing element.

41. A method as in claim 40, wherein the broadband information comprises analog video information and associated audio information.

42. A communication system comprising:

broadcast information sources operated by a plurality of service providers;

a plurality of subscriber terminals; and a communication network selectively supplying signals from one of the broadcast information sources to one of the subscriber terminals, the communication network comprising:

(a) at least one asynchronous transport mode (ATM) processing element routing the signals from the one broadcast information source through a portion of the communication network in a sequence of ATM cells, each ATM cell in the sequence comprising a payload section containing a portion of the signals from the one information source and a cell header comprising a virtual path identifier (VPI) assigned to the service provider operating the one broadcast information source and a virtual circuit identifier (VCI) which identifies a program service broadcast through the communication network by the provider operating the one broadcast information source, wherein the at least one ATM processing element uses the VPI or the VCI to process the ATM cells in the sequence; and (b) a network control element administering the operation of the communication network, wherein:

(1) the VPI and the VCI are constant so that the ATM cells in the sequence pass through the at least one ATM processing element with said VPI and said VCI in each cell and are output by the at least one ATM processing element with said VPI and said VCI in each cell, and (2) in response to a subscriber selection of the broadcast program service, the communication network supplies information from a cell stream having cell headers containing the VPI assigned to the one service provider and the VCI assigned to the broadcast program service from payload sections of cells output by the at least one ATM processing element to the one subscriber terminal.

43. A communication system as in claim 42, further comprising means for gathering usage statistics based on said VPI and said VCI.

44. A communication network as in claim 42, wherein the network control element administers at least one function of the communication network based on said VPI.

45. A communication network as in claim 42, wherein the network control element administers at least one function of the communication network based on said VCI.

46. A communication system as in claim 42, wherein the at least one ATM processing element serves as part of a backbone network, and the communication network further comprises a local loop network for transporting the signals from the one broadcast information source from an output of the at least one ATM processing element to the one subscriber terminal.

47. A communication system as in claim 46, wherein:

the at least one ATM processing element comprises a broadcast system which broadcasts the sequence of ATM cells to a plurality of nodes of the local loop network, and one node of the local loop network comprises means for supplying selected cells from the broadcast sequence of ATM cells to the one subscriber terminal.

48. A communication system as in claim 47, wherein:

the means for supplying selectively routes the ATM cell sequence to the subscriber terminal, and the ATM cells in the sequence pass through the means for supplying with said VPI and said VCI in each cell and are output to the one terminal with said VPI and VCI in each cell.

49. A communication system as in claim 47, wherein the broadcast system comprises:

at least two optical fibers carrying ATM cell sequences from the broadcast information sources;

an ATM edge device receiving the ATM cell sequences from the at least two optical fibers and supplying the ATM cell sequences to one output; and a broadcast optical fiber network transporting the ATM cell sequences from the one output of the ATM edge device to the plurality of nodes of the local loop network.

50. A communication system as in claim 42, wherein the one broadcast information source comprises:

an encoder encoding broadband information into digitized data and encapsulating the digitized data in packets; and an ATM multiplexer mapping the packets into ATM cells and adding said VPI and said VCI in a header of each cell to form the sequence of ATM cells.

* * * * *